(12) United States Patent
Ochiai

(10) Patent No.: US 6,547,274 B2
(45) Date of Patent: Apr. 15, 2003

(54) AIR BAG DEVICE

(75) Inventor: Fumiharu Ochiai, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/778,650

(22) Filed: Feb. 7, 2001

(65) Prior Publication Data

US 2001/0024031 A1 Sep. 27, 2001

(30) Foreign Application Priority Data

| Feb. 7, 2000 | (JP) | 2000-034341 |
| Feb. 7, 2000 | (JP) | 2000-034342 |
| Feb. 9, 2000 | (JP) | 2000-038109 |

(51) Int. Cl.[7] .................. B60R 21/32; B60R 21/26; B60R 21/30; B60R 21/28
(52) U.S. Cl. .................. 280/735; 280/736; 280/739; 280/742
(58) Field of Search .................. 280/739, 742, 280/735, 736, 741

(56) References Cited

U.S. PATENT DOCUMENTS

| 5,366,242 A | * | 11/1994 | Faigle et al. |
| 5,388,860 A | * | 2/1995 | Breded et al. |
| 5,695,214 A | * | 12/1997 | Faigle et al. |
| 5,707,078 A | * | 1/1998 | Swanberg et al. |
| 5,709,405 A | * | 1/1998 | Saderholm et al. |
| 5,743,558 A | * | 4/1998 | Seymour |
| 6,017,056 A | * | 1/2000 | Lee |
| 6,039,346 A | * | 3/2000 | Ryan et al. |
| 6,241,279 B1 | * | 6/2001 | Ochiai |
| 6,273,463 B1 | * | 8/2001 | Peeterson et al. |
| 6,435,549 B1 | * | 8/2002 | Ochiai .................. 280/735 |

FOREIGN PATENT DOCUMENTS

| JP | 11334519 A | * | 12/1999 |
| JP | 11334520 A | * | 12/1999 |
| JP | 11334521 A | * | 12/1999 |
| JP | 11334522 A | * | 12/1999 |
| JP | 11334523 A | * | 12/1999 |
| JP | 11334525 A | * | 12/1999 |
| JP | 2001213265 A | * | 8/2001 |

* cited by examiner

Primary Examiner—Paul N. Dickson
Assistant Examiner—Joselynn Y Sliteris
(74) Attorney, Agent, or Firm—Carrier, Blackman & Associates, P.C.; Joseph P. Carrier; William D. Blackman

(57) ABSTRACT

An air bag device includes a control valve capable of opening and closing a vent hole provided in a retainer, and a sufficient opening degree of the control valve can be ensured by use of a small-sized and inexpensive actuator. For this purpose, the control valve for opening and closing the vent hole defined in the retainer supporting an inflator and an air bag in the air bag device is opened and closed by plural valve members each operated by a piezoelectric element serving as an actuator. The plurality of divided valve members of the control valve are used and hence, even if the size of the piezoelectric element for operating each of the valve members is reduced to provide a reduction in cost, a sufficient opening degree of the entire control valve is ensured.

17 Claims, 29 Drawing Sheets

AIR BAG DEVICE

BACKGROUND OF THE INVENTION

1. Field of the Invention

The present invention relates to an air bag device including an inflator accommodated in a retainer to which a peripheral edge of an opening of a folded-up air bag is fixed, so that the air bag is deployed by a gas generated by the inflator upon collision of a vehicle to restrain an occupant, wherein a vent hole defined in the retainer is opened and closed by a control valve operated by an actuator.

2. Description of the Related Art

In a conventional air bag device, a vent hole is provided in an air bag, which is expanded by a gas generated by an inflator, so that a portion of the gas is discharged through the vent hole to control the internal pressure in the air bag. There is such a proposed air bag device, which is designed so that a vent hole is previously closed by a thin membrane, whereby an air bag is expanded promptly at an initial stage of the deployment of the air bag, and when the internal pressure in the air bag is raised after completion of the deployment, the thin membrane is broken to permit a gas to be discharged through the vent hole, thereby softly restraining an occupant (see Japanese Utility Model Registration Publication No.5-6206).

There is also such a proposed air bag device, which includes two inflators is designed so that when no occupant exists in the vicinity of the air bag device, both of the two inflators are ignited, whereas when an occupant exists in the vicinity of the air bag device, only one of the inflators is ignited, whereby the speed of deployment of and the internal pressure in an air bag are controlled in accordance with the position of the occupant (see Japanese Patent Application Laid-open No.9-301115).

The air bag device described in the above Japanese Utility Model registration Publication No.5-6206 suffers from a problem that a scattering is liable to be generated in pressure breaking the thin membrane and for this reason, it is difficult not only to properly open the vent hole at the time when the internal pressure in the air bag reaches a predetermined value, but also to accurately control the internal pressure, because the vent hole once opened cannot be closed. The air bag device described in the above Japanese Patent Application Laid-open No.9-301115 suffers from a problem that the two inflators are required, not only resulting in an increased number of parts, causing an increase in cost, but also the characteristic of deployment of the air bag can be controlled at two stages only and for this reason, it is difficult to carry out a fine control.

Therefore, there is a proposed air bag device, in which a vent hole is defined in a housing having an inflator accommodated therein, so that the speed of deployment of and the internal pressure in an air bag are finely controlled by opening and closing the vent hole by a control valve operated by a motor (see Japanese Utility Model No.3042312).

However, the air bag device proposed in Japanese Utility Model No.3042312 suffers from a problem that a single valve member of a control valve is operated by the motor to open and close the vent hole and for this reason, to ensure a sufficient opening degree of the control valve, it is necessary to operate the valve member by a large-sized motor to a large extent, thereby bringing about an increase in cost and an increase in size of the air bag device.

When a piezoelectric element is employed as an actuator for opening and closing the valve member, a load produced by the piezoelectric element and the amount of piezoelectric element flexure are in inverse proportion to each other. For this reason, when a large-sized piezoelectric element is employed to open and close a large-size valve member, not only the cost is increased, but also there is a possibility that the amount of piezoelectric element flexure may be insufficient, resulting in an insufficient opening degree of the control valve.

Therefore, there is an air bag device proposed by the present applicant, in which a vent hole is defined in a retainer having an inflator accommodated therein, so that the speed of deployment of and the internal pressure in an air bag are finely controlled by opening and closing the vent hole by a control valve operated by an actuator (see Japanese Patent Application No.10-143781).

In the air bag device proposed in the above Japanese Patent Application No.10-143781, when the vent hole is closed to be covered from the outside by the valve member formed of an elastomeric material, the valve member can be flexed outwards by the pressure of a high-pressure gas ejected into the retainer by the inflator, thereby automatically opening the vent hole. In this case, however, the following problem is encountered: It is difficult to set the elasticity of the valve member and the pressure receiving area, and to open the valve member with an appropriate timing and at an appropriate opening degree.

In addition, the air bag device proposed in the above Japanese Patent Application No. 10-143781 includes a control valve having a piezoelectric element which is adhered to a protector made of a strip-shaped metal and having the same shape as the protector, so that the protector is curved along with the piezoelectric element by supplying current to the piezoelectric element, thereby opening the vent hole. However, the control valve is not provided with a means for limiting the maximum opening degree of the control valve and for this reason, there is a possibility that the control valve may be over-flexed to a large extent, resulting in an excessive opening degree, or the brittle piezoelectric element may be excessively deformed and thus damaged.

SUMMARY OF THE INVENTION

Accordingly, it is a first object of the present invention that the opening degree of a control valve for opening and closing a vent hole in an air bag device can be ensured at a sufficient level by use of a small-sized and inexpensive actuator.

It is a second object of the present invention to ensure that when the valve member of the control valve covering the vent hole in an air bag device from the outside is formed from an elastomeric material, the opening degree of the control valve can be controlled appropriately.

It is a third object of the present invention to provide an air bag device including a control valve capable of opening and closing a vent hole defined in a retainer, wherein a valve member of the control valve can be prevented from being excessively deformed.

To achieve the above first object, according to a first aspect and feature of the present invention, there is provided an air bag device including an inflator accommodated in a retainer to which a peripheral edge of an opening of a folded-up air bag is fixed, so that the air bag is deployed by a gas generated by the inflator upon collision of a vehicle to restrain an occupant, and a control valve operated by an actuator for opening and closing a vent hole defined in the retainer, the control valve including a plurality of divided valve members.

With the above arrangement, the speed of deployment of the air bag, the magnitude of the restraining force provided by the air bag, the speed of contraction of the air bag and the like can be determined at any values in accordance with the state of the collision and the state of an occupant by controlling the opening degree of the vent hole for escape of the high-pressure gas, when the air bag is deployed by the high-pressure gas generated by the inflator. The control valve has the plurality of divided valve members and hence, even if the size of the actuator for operating each of the valve members is reduced to provide a reduction in cost, a sufficient opening degree of the entire control valve can be ensured.

To achieve the first object, according to a second aspect and feature of the present invention, in addition to the first feature, the actuator is a piezoelectric element.

With the above arrangement, the size of the actuator can be reduced remarkably by employment of the piezoelectric element.

To achieve the first object, according to a third aspect and feature of the present invention, in addition to the first feature, the plurality of valve members are curved and opened, the direction of curving of at least one of the valve members being different from that of the remaining valve members.

To achieve the second object, according to a fourth aspect and feature of the present invention, there is provided an air bag device including an inflator accommodated in a retainer to which a peripheral edge of an opening of a folded-up air bag is fixed, so that the air bag is deployed by a gas generated by the inflator upon collision of a vehicle to restrain an occupant, a control valve operated by an actuator for controlling an opening degree of a vent hole defined in the retainer, the control valve including a valve member which is formed of an elastomeric material and supported to cover the vent hole from the outside, so that when the vent hole is opened by a gas generated by the inflator, the actuator selectively generates a load in a direction to close or open the vent hole by the valve member.

With the above arrangement, the speed of deployment of the air bag, the magnitude of the restraining force provided by the air bag, the speed of contraction of the air bag and the like can be determined at any values in accordance with the state of the collision and the state of an occupant by controlling the opening degree of the vent hole for escape of the high-pressure gas, when the air bag is deployed by the high-pressure gas generated by the inflator. When the valve member formed of the elastomeric material is flexed and opened by the pressure of the gas generated by the inflator, the opening degree of the valve member can be controlled appropriately by supplying current to the actuator to generate a load in a direction to inhibit the opening of the valve member, or by supplying current to the actuator to generate a load in a direction to promote the opening of the valve member of the control valve.

To achieve the third object, according to a fifth aspect and feature of the present invention, there is provided an air bag device including an inflator accommodated in a retainer to which a peripheral edge of an opening of a folded-up air bag is fixed, so that the air bag is deployed by a gas generated by the inflator upon collision of a vehicle to restrain an occupant, a control valve having a valve member operated by an actuator for opening and closing a vent hole defined in the retainer, and a stopper for limiting the maximum opening degree of the valve member of the control valve.

With the above arrangement, the speed of deployment of the air bag, the magnitude of the restraining force provided by the air bag, the speed of contraction of the air bag and the like can be determined at any values in accordance with the state of the collision and the state of an occupant by controlling the opening degree of the vent hole for escape of the high-pressure gas, when the air bag is deployed by the high-pressure gas generated by the inflator. In addition, the maximum opening degree of the valve member of the control valve is limited by the stopper and hence, it is possible to prevent the valve member from being flexed to a large extent by the pressure of the high-pressure gas flowing through the vent hole, resulting in an excessive opening degree, and to prevent the actuator from being excessively deformed and thus damaged.

To achieve the third object, according to a sixth aspect and feature of the present invention, in addition to the fifth feature, a seal member is mounted on at least one of a valve seat formed at a peripheral edge of the vent hole and the valve member seated on the valve seat.

With the above arrangement, the valve member and the valve seat at the peripheral edge of the vent hole are put into abutment against each other with the seal member interposed therebetween and hence, it is possible to reliably prevent the high-pressure gas from being leaked from a gap between the vent hole and the valve seat.

To achieve the third object, according to a seventh aspect and feature of the present invention, in addition to the fifth feature, a projection is provided around the periphery of the vent hole and adapted to abut against the outer periphery of the valve member to position the valve member relative to the vent hole.

With the above arrangement, the valve member can be mounted at a proper position relative to the vent hole by bringing the projection provided around the periphery into abutment against the outer periphery of the valve member to position the valve member relative to the vent hole.

To achieve the third object, according to an eighth aspect and feature of the present invention, in addition to the fifth feature, the actuator comprises a piezoelectric element adhered to the valve member, and the valve member is provided with an opening in which an adhesive is provided in order to increase the strength of adhesion between the valve member and the actuator.

With the above arrangement, the piezoelectric element is adhered to the valve member provided with the opening and the adhesive and hence, the valve member and the piezoelectric element can be adhered firmly to each other.

The above and other objects, features and advantages of the invention will become apparent from the following description of the preferred embodiments taken in conjunction with the accompanying drawings.

BRIEF DESCRIPTION OF THE DRAWINGS

FIGS. 1 to 13 show a first embodiment of the present invention, wherein

FIG. 1 is a perspective view of a front portion of a vehicle compartment of an automobile;

FIG. 2 is an enlarged sectional view taken along a line 2—2 in FIG. 1;

FIG. 3 is a sectional view taken along a line 3—3 in FIG. 2;

FIG. 4 is a view taken along a line 4—4 in FIG. 2;

FIG. 5 is a sectional view taken along a line 5—5 in FIG. 4;

FIG. 6 is an exploded perspective view of an air bag device for a driver's seat;

FIG. 7 is a view similar to FIG. 4, but showing a modification to the first embodiment;

FIG. 8 is a sectional view taken along a line 8—8 in FIG. 7;

FIG. 9 is an enlarged sectional view taken along a line 9—9 in FIG. 1;

FIG. 10 is a sectional view taken along a line 10—10 in FIG. 9;

FIG. 11 is a view taken in a direction of an arrow 11 in FIG. 10;

FIG. 12 is a sectional view taken along a line 12—12 in FIG. 11;

FIG. 13 is an exploded perspective view of an air bag device for an assistant driver's seat;

FIGS. 14 and 15 show a second embodiment of the present invention, wherein FIG. 14 is a view similar to FIG. 11, and FIG. 15 is a sectional view taken along a line 15—15 in FIG. 14;

FIGS. 16 to 24 show a third embodiment of the present invention, wherein

FIG. 16 is a view similar to FIG. 2;

FIG. 17 is an enlarged view taken along a line 17—17 in FIG. 16;

FIG. 18 is a sectional view taken along a line 18—18 in FIG. 17;

FIG. 19 is a sectional view taken along a line 19—19 in FIG. 18;

FIG. 20 is an exploded perspective view of an air bag device for a driver's seat;

FIG. 21 is a view similar to FIG. 9;

FIG. 22 is a sectional view taken along a line 22—22 in FIG. 21;

FIG. 23 is an exploded perspective view of an air bag device for an assistant driver's seat;

FIG. 24 is a graph showing how the valve opening load provided by a gas and the opening degree of a control valve are varied in accordance with the amount of current supplied to an actuator;

FIGS. 25 to 28 show a fourth embodiment of the present invention, wherein

FIG. 25 is a view similar to FIG. 9;

FIG. 26 is a sectional view taken along a line 26—26 in FIG. 25;

FIG. 27 is a view taken in a direction of an arrow 27 in FIG. 26;

FIG. 28 is an exploded perspective view of an air bag device for an assistant driver's seat;

DESCRIPTION OF THE PREFERRED EMBODIMENTS

A first embodiment of the present invention will now be described with reference to FIGS. 1 to 13.

Figure 1:
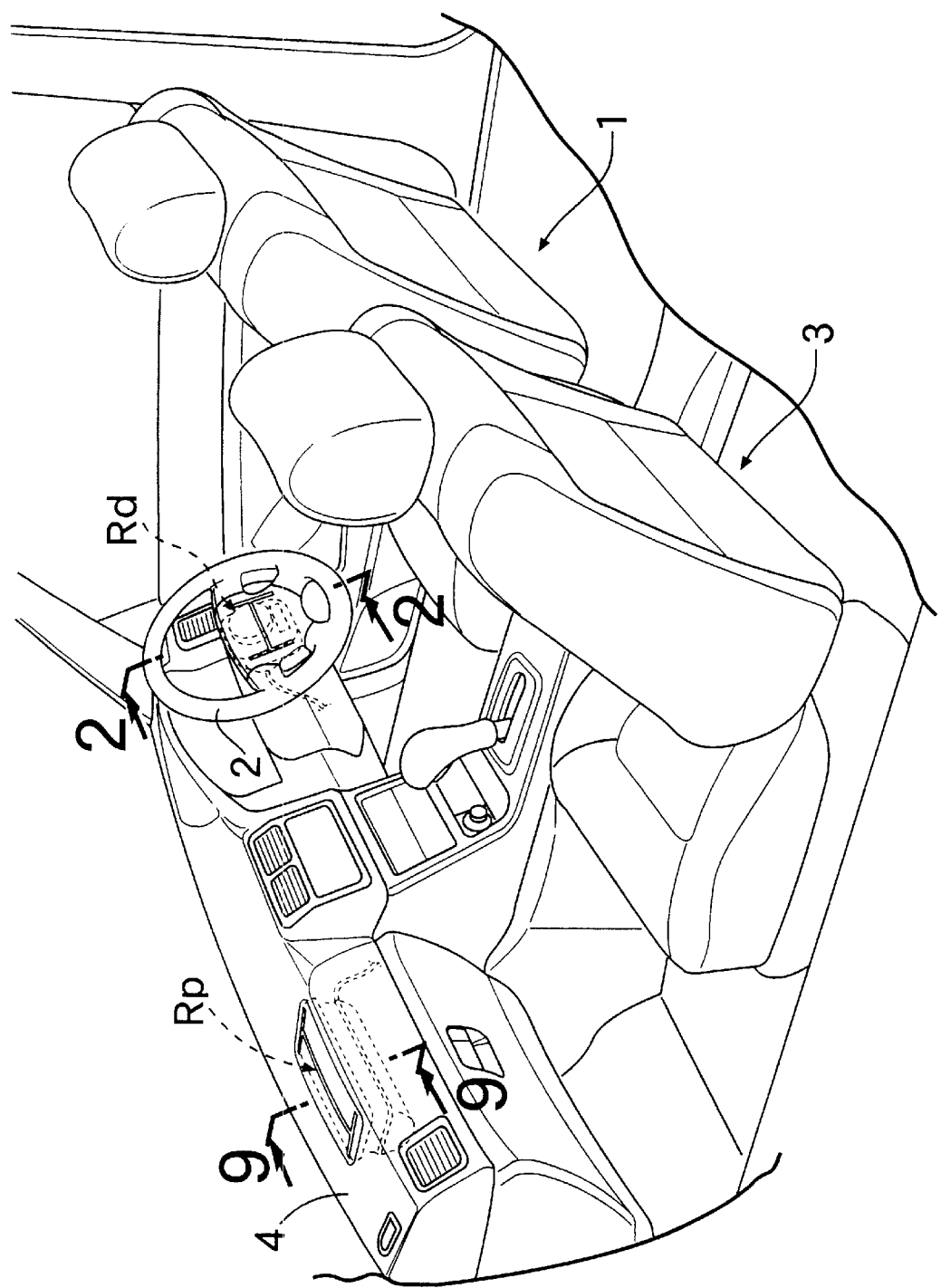
Figure 2:
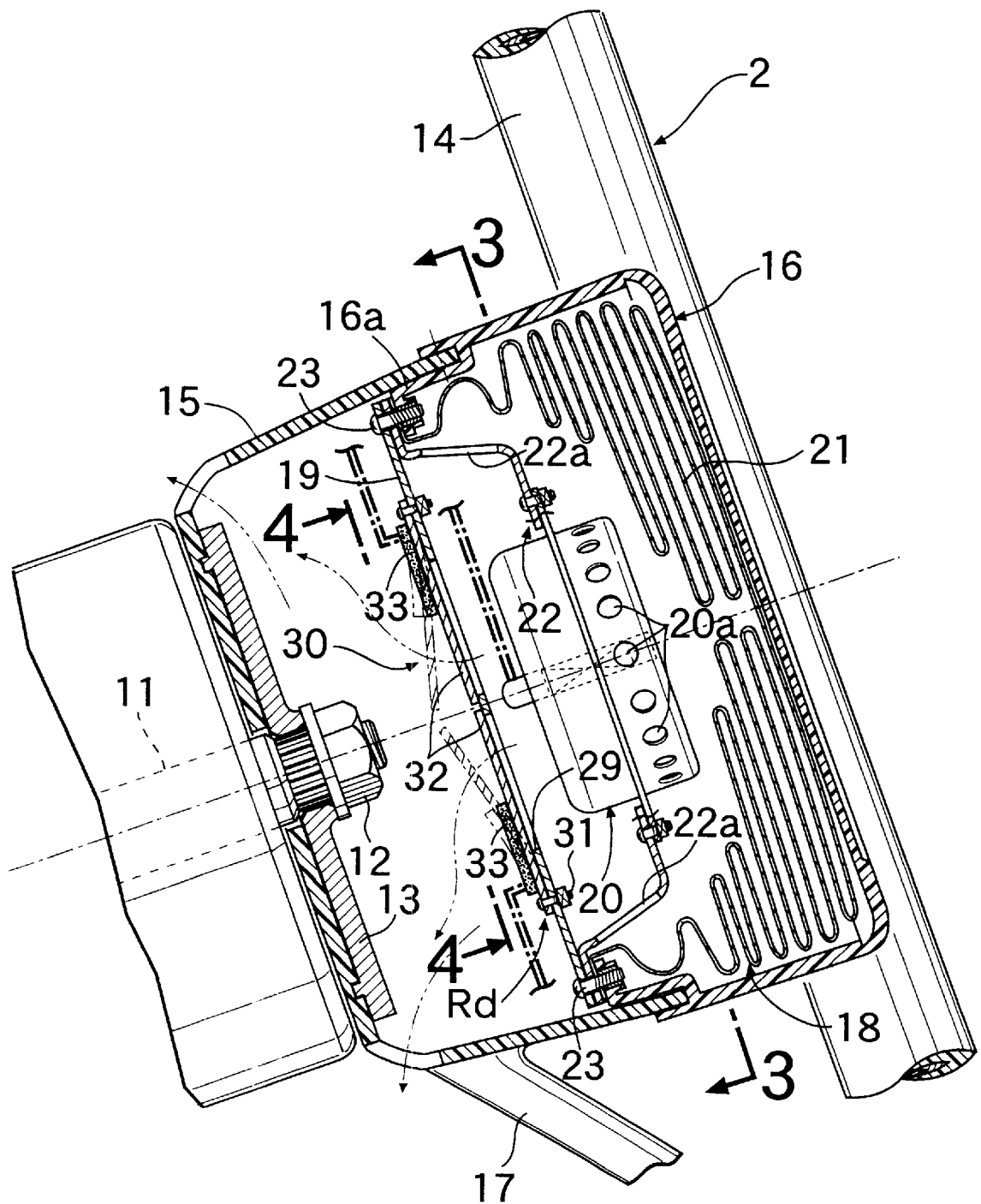
Figure 3:
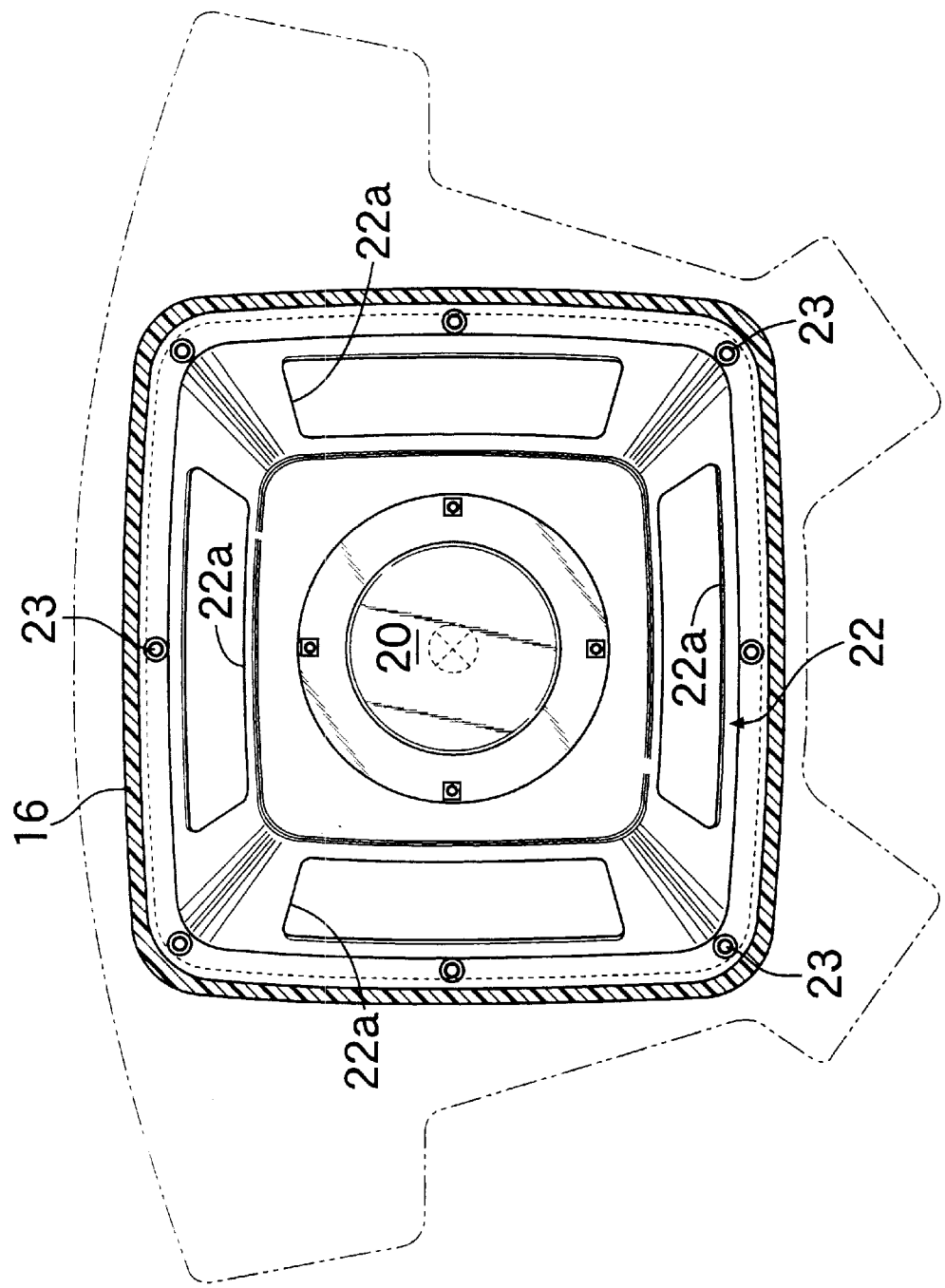
Figure 4:
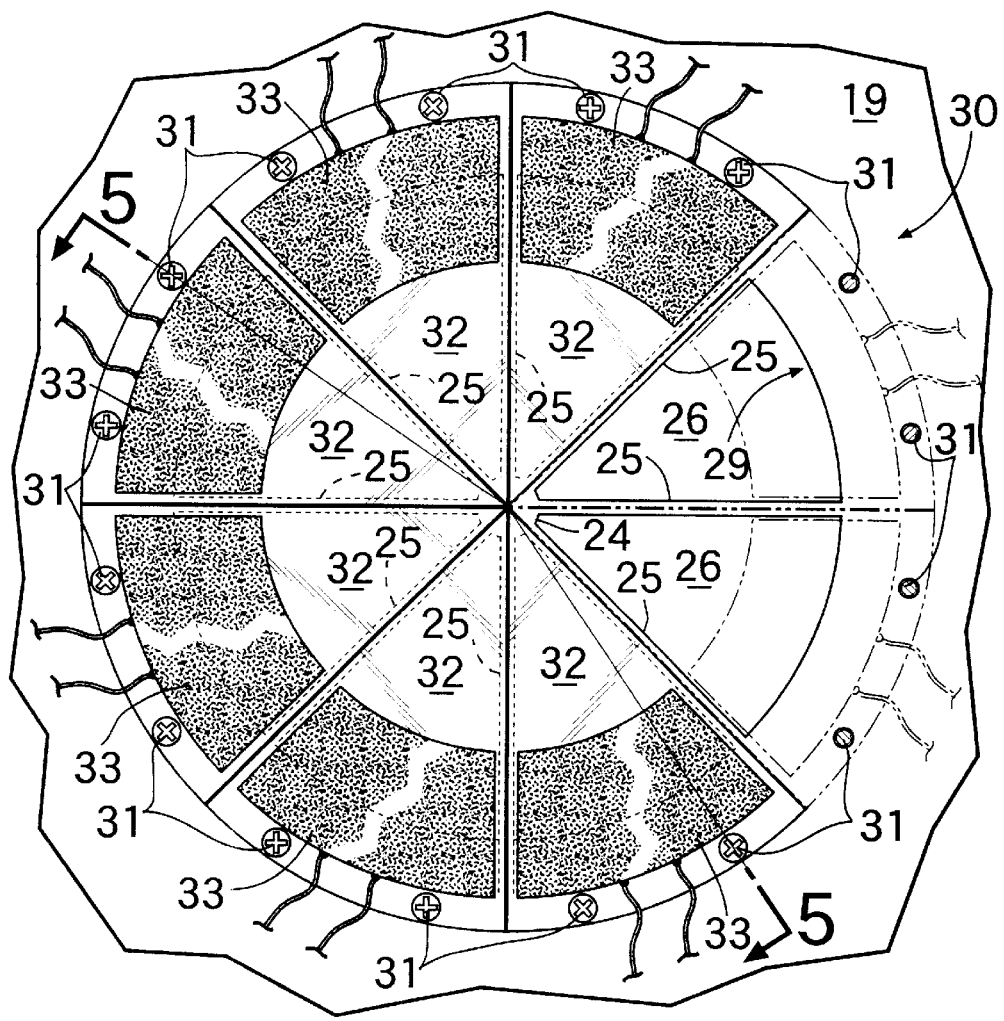

Referring to FIG. 1, an air bag device Rd for a driver's seat 1 is mounted at a central portion of a steering wheel 2 disposed in front of a driver's seat 1, and an air bag device Rp for an assistant driver's or front passenger's seat 3 is mounted at an upper portion of a dash board 4 disposed in front of the assistant driver's seat 3.

The structure of the air bag device Rd for the driver's seat will be described below with reference to FIGS. 2 to 6.

The steering wheel 2 includes a steering boss 13 which is relatively non-rotatably fitted to a rear end of a steering shaft 11 and fixed thereto by a nut 12, an annular wheel rim 14 disposed to surround the steering boss 13, a front cover 15 fixed to the steering boss 13, a rear cover 16 coupled to the front cover 15, and a plurality of spokes 17 which connect the front cover 15 to the wheel rim 14. An air bag module 18 is accommodated in a space defined by the front cover 15 and the rear cover 16.

The air bag module 18 is comprised of a retainer 19 for supporting the air bag module 18 within the rear cover 16, an inflator 20 generating a high-pressure gas, and an air bag 21 which is expanded by the high-pressure gas generated by the inflator 20. An outer periphery of the quadrangular plate-shaped retainer 19, an outer periphery of a bracket 22 centrally supporting the inflator 20 and a peripheral edge of an opening in the air bag 21 are superposed on one another and commonly clamped by a plurality of bolts 23 to a mounting flange 16a integrally formed on an inner periphery of the rear cover 16. The inflator 20 is provided with gas ejecting ports 20a, which open into an internal space in the air bag 21. The internal space in the air bag 21 communicates with a space defined between the bracket 22 and the retainer 19 through four through-bores 22a defined in the bracket 22.

A circular vent hole 29 is defined in the retainer 19 facing the bracket 22 and divided into eight substantially fan-shaped openings 26 by eight radiate seats 25 extending radiately from a circular central seat 24. A control valve 30 for controlling the opening degree of the vent hole 29 includes eight valve members 32 corresponding to the eight openings 26, respectively. Each of the valve members 32 is fixed at an arcuate outer-peripheral portion to the retainer 19 by two bolts 31, 31. In this state, two straight portions of each of the eight valve members 32 are seated on the central seat 24 and the eight radiate seats 25, and the eight openings 26 in the vent hole 29 are closed by the eight valve members 32.

Figure 5:
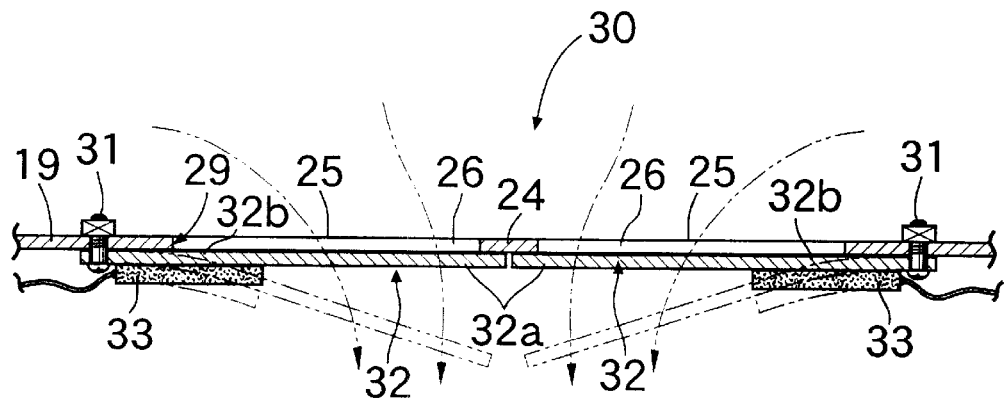
Figure 6:
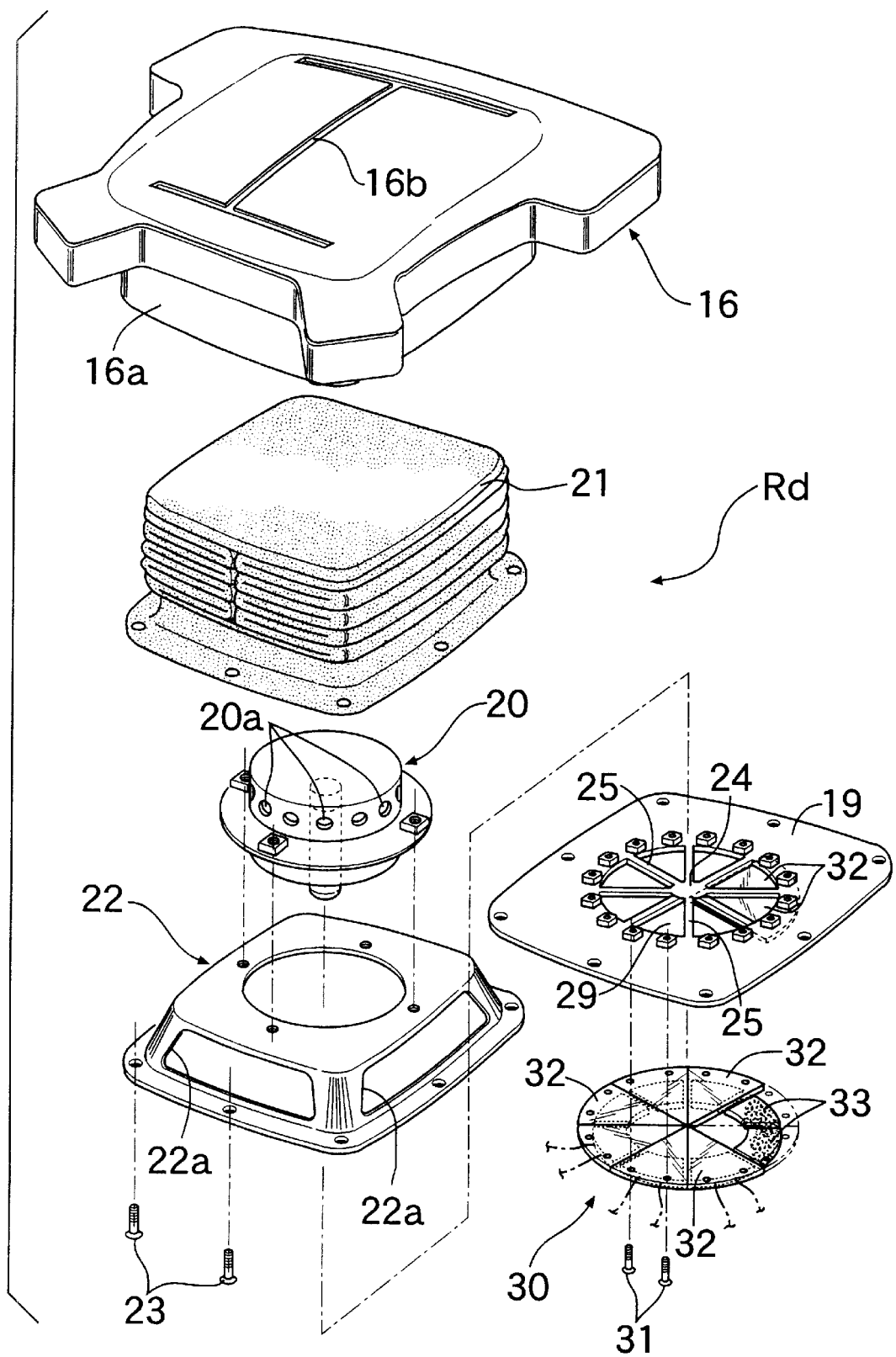

Each of the valve members 32 is comprised of a body portion 32a covering the vent hole 29, and a hinge portion 32b provided at a location on the body portion 32a closer to the bolts 31 (see FIG. 5). A piezoelectric element 33 as an actuator is bonded to a back of the hinge portion 32b in order to bend the valve member 32 at the hinge portion 32b. A reduction in size of the control valve 30 can be achieved by employing the small-size lightweight piezoelectric element 33 as the actuator.

When an acceleration equal to or larger than a predetermined value is detected upon collision of a vehicle, an air bag deployment control unit (not shown) ignites the inflator 20, and the air bag 21 brakes a thin tear-off line 16b (see FIG. 6) formed into an H-shape on the rear cover 16 to deploy into a vehicle compartment. During this time, the amount of current supplied to the piezoelectric elements 33 of the control valve 30 is controlled in accordance with the attitude and the physique of an occupant or a vehicle speed or the like to change the opening degree of the vent hole 29.

More specifically, when current is not supplied to the piezoelectric elements 33, the hinge portions 32b of the eight valve members 32 of the control valve 30 extend rectilinearly, as shown by solid lines in FIG. 5, and the body portions 32a connected to the hinge portions 32b close the openings 26 of the vent hole 29. When the current is supplied to the piezoelectric elements 33 from this state, the piezoelectric elements 33 are contracted in accordance with the amount of current supplied, as shown by dashed lines in FIG. 5 and hence, the hinge portions 32b of the valve members 32 are curved, whereby the body portions 32a open the openings 26 of the vent hole 29.

In this way, the opening degree of the vent hole 29 can be controlled accurately and continuously by an extremely simple structure in which the hinge portions 32b are curved by only supplying the current to the piezoelectric elements 33 mounted on the valve members 32 covering the vent hole 29. Moreover, the piezoelectric elements 33 are mounted on only the hinge portions 32b of the valve members 32 of the control valve 30 and hence, as compared with a case where the piezoelectric elements 33 are mounted on the entire surfaces of the body portions 32a of the valve members 32, not only the amount of expensive piezoelectric elements 33 used can be decreased to contribute to a reduction in cost, but also the small movements of the piezoelectric elements 33 can be increased and transmitted to the valve members 32. Moreover, the plurality of divided valve members 32 of the control valve 30 are used and hence, the size of each of the piezoelectric elements 33 for operating each of the valve members 32 can be reduced to provide a reduction in cost, while ensuring a required opening degree provided by the control valve 30.

Figure 7:
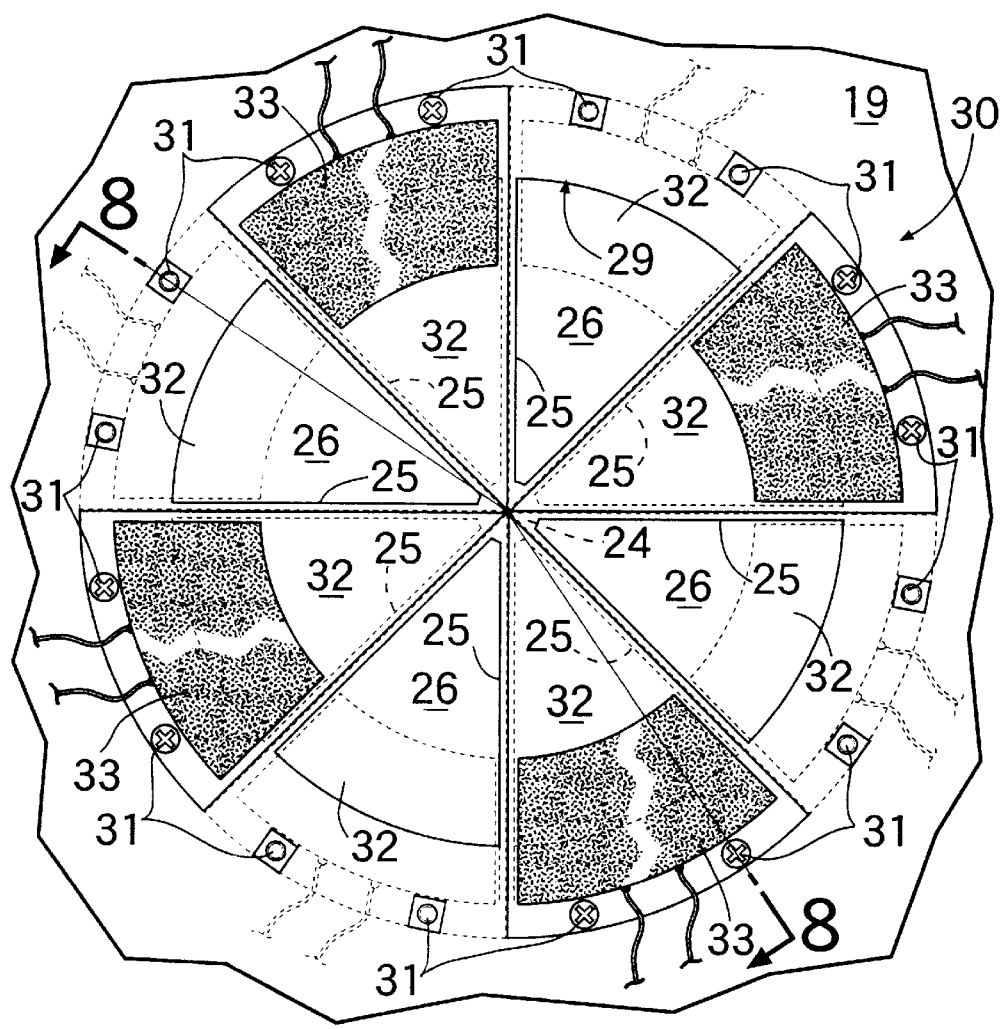
Figure 8:
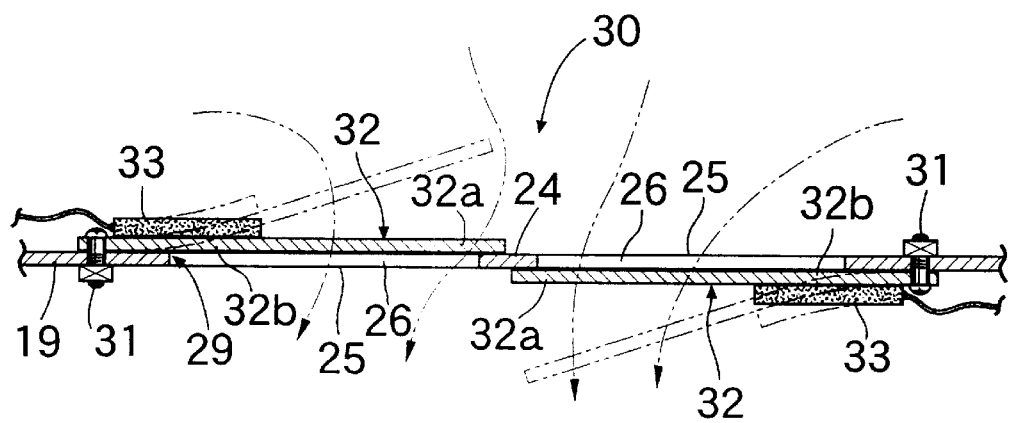
Figure 9:
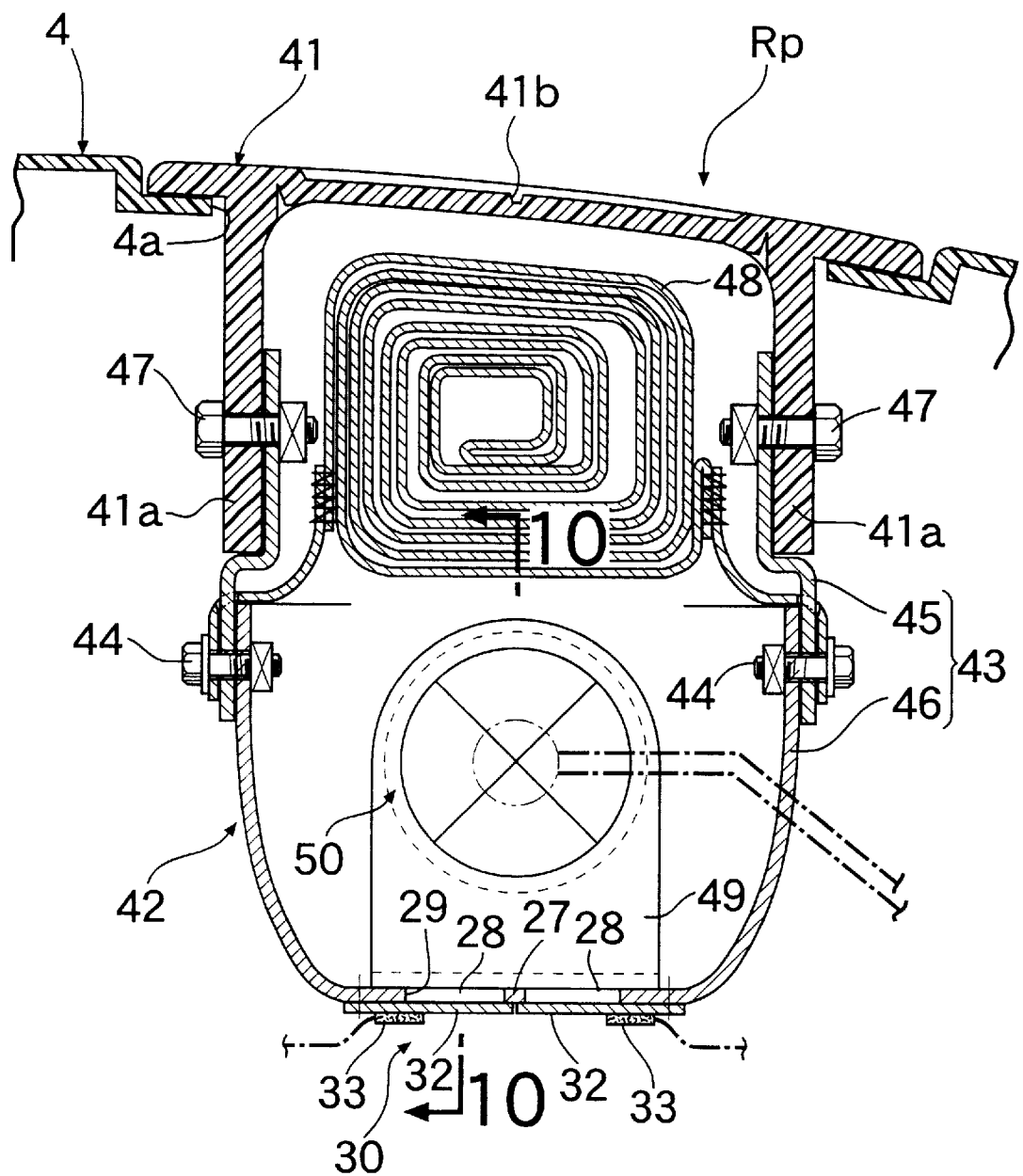
Figure 10:
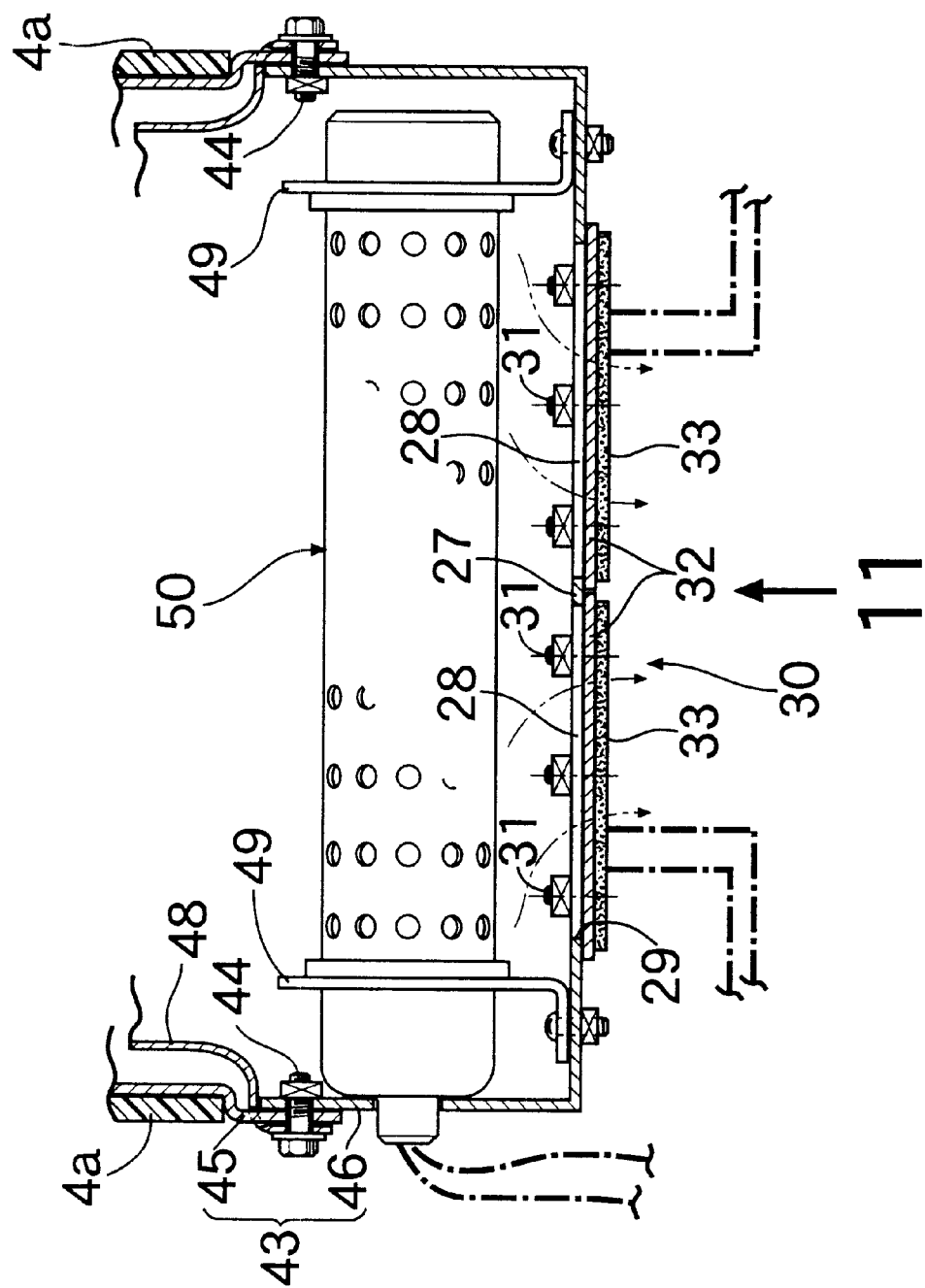

FIGS. 7 and 8 show a modification to the first embodiment.

In this modification, eight valve members 32 of the control valve 30 are mounted alternately to an inner surface and an outer surface of the retainer 19. In such arrangement, the four valve members 32 mounted to the outer surface of the retainer 19 are curved outwards by supplying current to the piezoelectric elements 33, while the other four valve members 32 mounted to the inner surface of the retainer 19 are curved inwards by supplying current to the piezoelectric elements 33. Therefore, the gap between the adjacent valve members 32 upon opening of the control valve can be increased, as compared with the first embodiment shown in FIG. 5. As a result, even if the size of each of the piezoelectric elements 33 is reduced, or the amount of current supplied to the piezoelectric elements 33 is reduced to reduce the amount by which the valve members 32 are curved, a sufficient opening degree of the vent hole 29 can still be ensured.

The structure of the air bag device Rp for the assistant driver's seat will be described below with reference to FIGS. 9 to 13.

A retainer assembly 43 of an air bag module 42 is fixed to support portions 41a extending from a lid 41 fixed in the opening 4a defined in the upper surface of the dash board 4. The retainer assembly 43 is comprised of an upper retainer 45 and a lower retainer 46, which are fixed by bolts 44. The upper retainer 45 is fixed to the support portions 41a of the lid 41 by a plurality of bolts 47. A peripheral edge of an opening in an air bag 48 is clamped between coupled portions of the upper and lower retainers 45 and 46 and commonly fastened thereto by the bolts 47. A thin tear-off line 41b is formed on the lid 41 to be broken upon expansion of the air bag 48. A cylindrical inflator 50 is supported on a bottom of the lower retainer 46 with a pair of mounting brackets 49, 49 interposed therebetween.

A rectangular vent hole 29 defined in the bottom the lower retainer 46 is divided into four openings 28 by a cross-shaped seat 27. A control valve 30 for opening and closing the vent hole 29 has a structure similar to that for the air bag device Rd for the driver's seat. More specifically, the control valve 30 includes four valve members 32 in correspondence to the four openings 28, so that each of hinge portions 32b of the valve members 32 is bent by supplying current to each of piezoelectric elements 33 mounted on the hinge portions 32b, whereby each of body portions 32a is displaced away from the vent hole 29 to discharge the surplus high-pressure gas (see FIG. 12).

Figure 11:
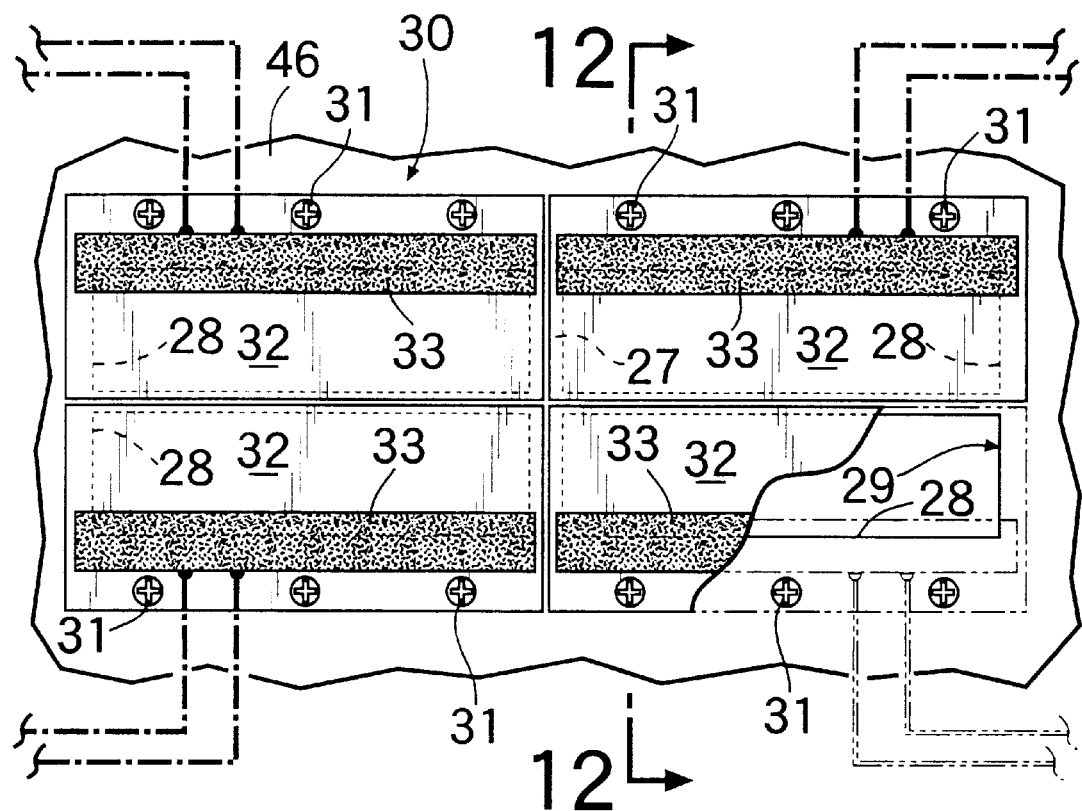
Figure 12:
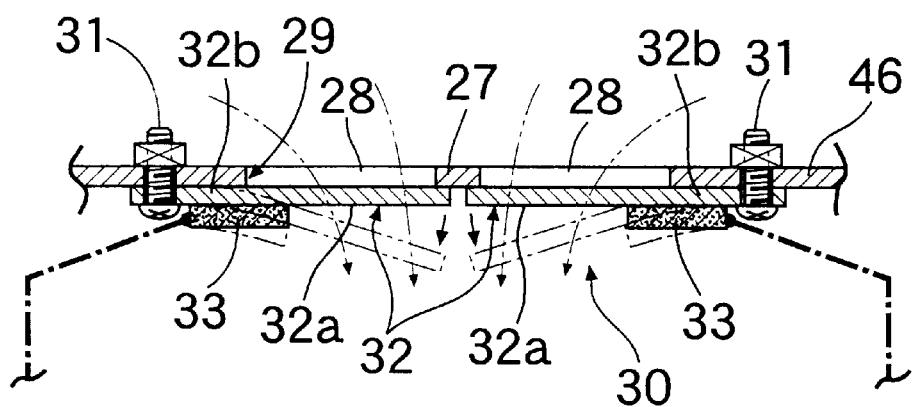
Figure 13:
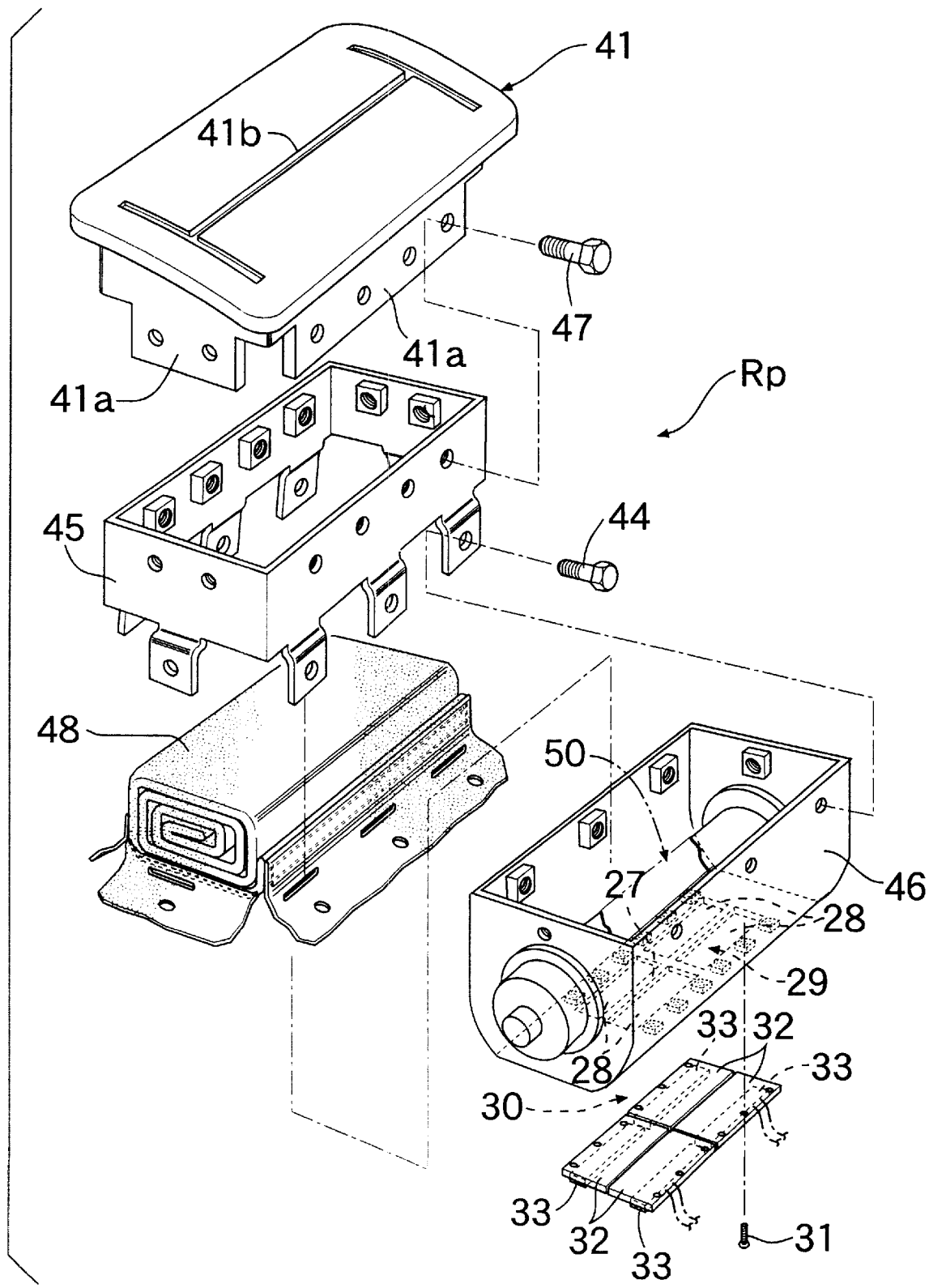

Both of a pair of the opposed valve members 32, 32 of the control valve 30 (the upper valve member 32 and the lower valve member 32 as viewed in FIG. 11) are flexed outwards of the lower retainer 46. If one of the pair of valve members 32, 32 is flexed outwards, and the other valve member 32 is flexed inwards, a sufficient opening degree of the vent hole 29 can be ensured, even if the amount of valve members 32, 32 curved is reduced.

The operation and effect of the air bag device Rp for the assistant driver's seat are identical to those of the above-described air bag device Rd for the driver's seat.

A second embodiment of a control valve 30 in the air bag device Rp for the assistant driver's seat will be described with reference to FIGS. 14 and 15.

Figure 14:
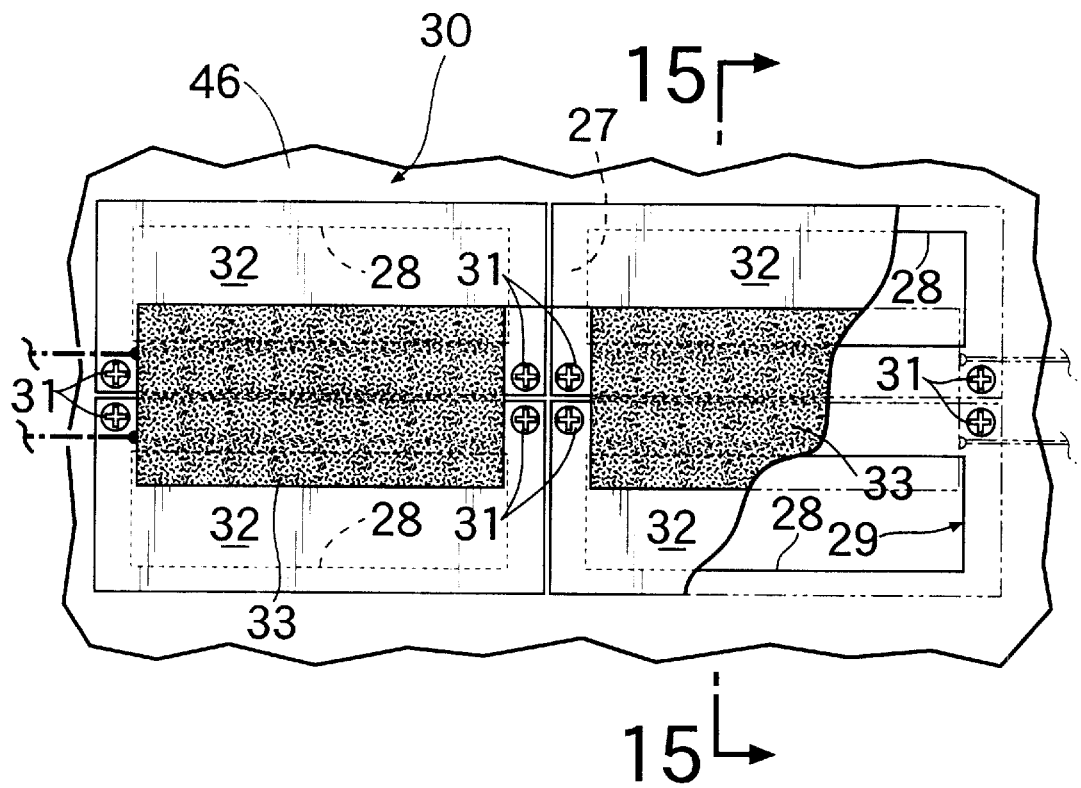
Figure 15:
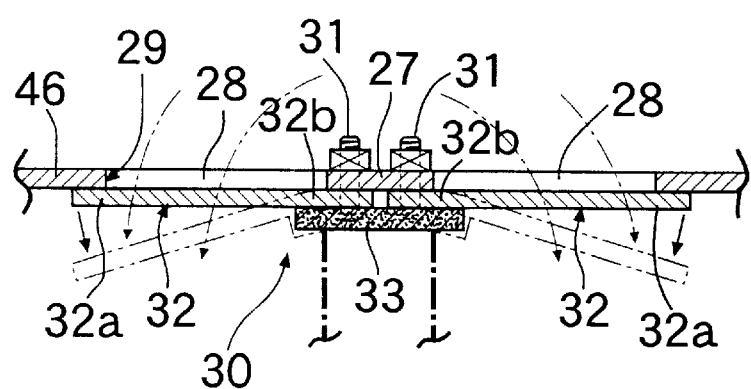
Figure 16:
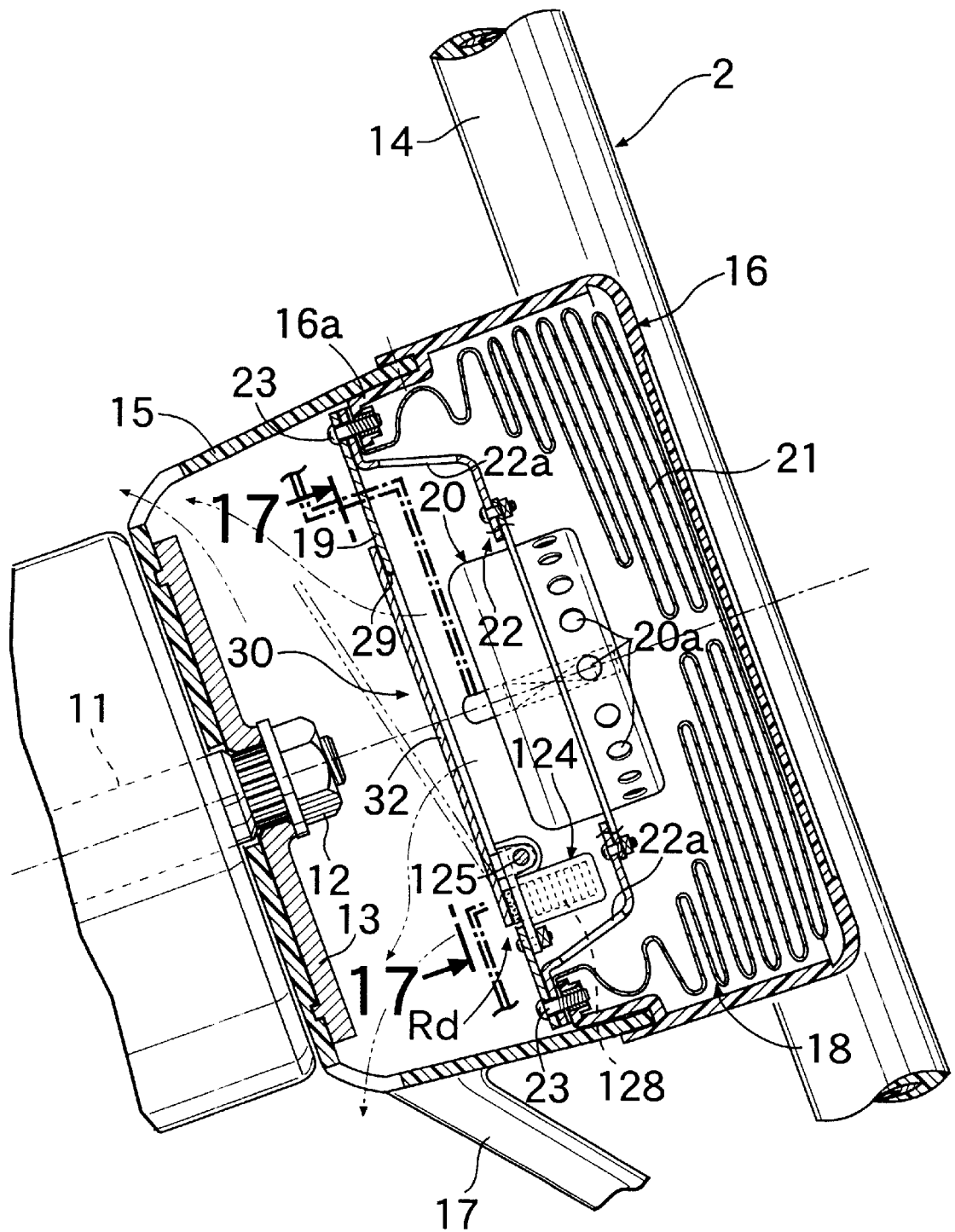
Figure 17:
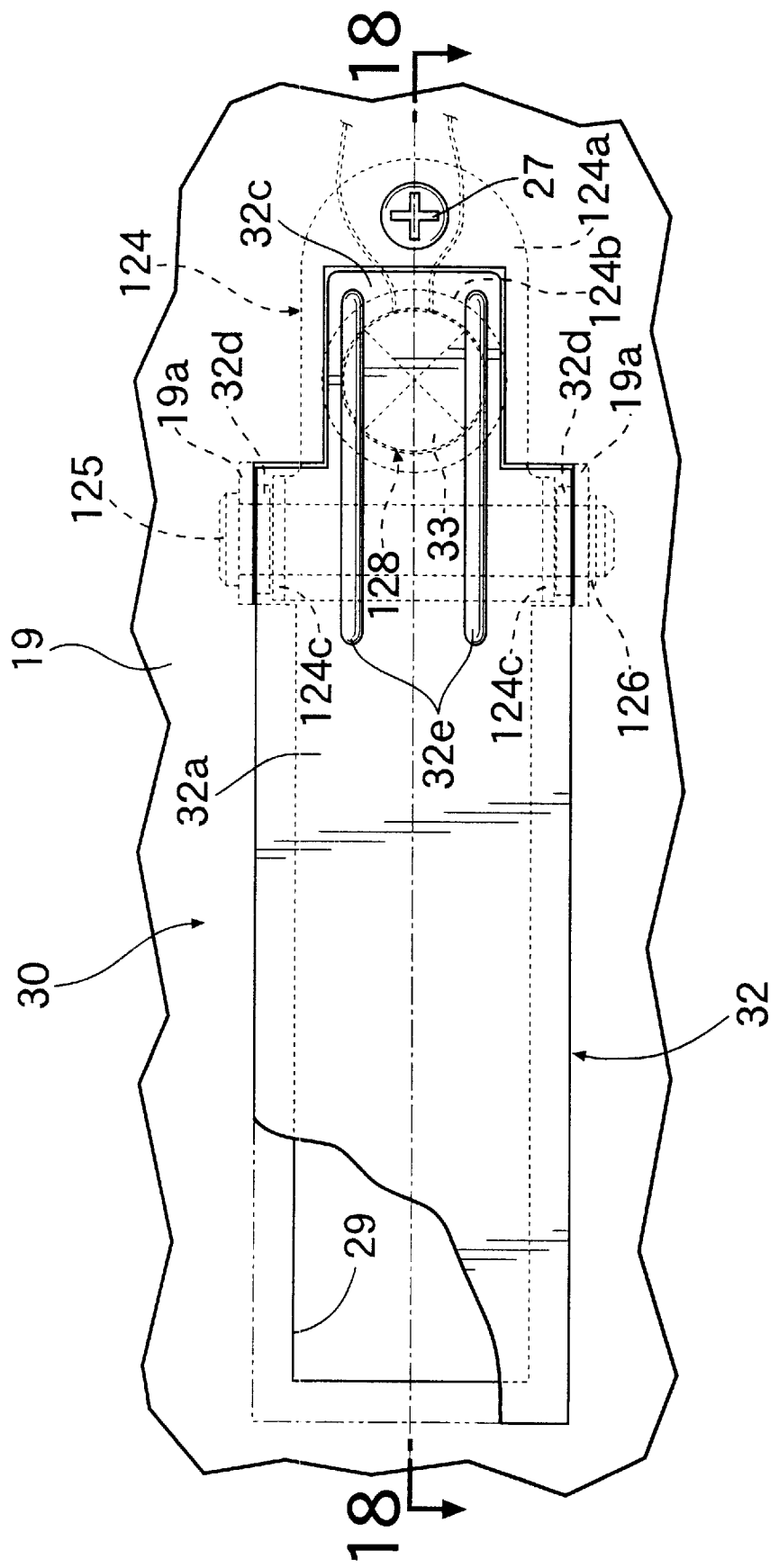

A pair of opposed valve members 32, 32 of the control valve 30 of the second embodiment (an upper valve member 32 and a lower valve member as viewed in FIG. 14) are operated by a common piezoelectric element 33 integrally connecting these valve members 32, 32. Therefore, although the four piezoelectric elements 33 are required for operating the four valve members 32 in the control valve 30 shown in FIG. 11, the two piezoelectric elements 33, 33 suffice to operate the four valve members 32 in the control valve 30 shown in FIG. 14, which can contribute to a reduction in number of parts.

A third embodiment of the present invention will now be described with reference to FIGS. 16 to 24.

First, the structure of an air bag device Rd for a driver's seat will be described with reference to FIGS. 16 to 20. The duplicated description of the same portions or components of the structure as in the first embodiment is omitted and mainly, different points will be described.

A substantially rectangular vent hole 29 is defined in a retainer 19 facing a bracket 22, and a pair of brackets 19a, 19a are located on laterally opposite sides of lengthwise one end of the vent hole 29 to protrude toward an inner surface of the retainer 19 (a surface opposed to the inflator 20). A control valve 30 for controlling the opening degree of the vent hole 29 includes a plate-shaped valve member 32 closing the vent hole 29 from the side of an outer surface of the retainer 19. A pair of brackets 32d, 32d are projectingly provided on laterally opposite sides of a narrow portion 32c connected to one end of a body portion 32a of the valve member 32. The valve member 32 is formed of a plate material having resiliency, and two lengthwise extending reinforcing beads 32e, 32e are formed in the vicinity of the pair of brackets 32d, 32d. An actuator housing 124 is superposed on an upper surface of the valve member 32 and includes a plate-shaped base portion 124a, a cylindrical portion 124b rising from the base portion 124a with its upper surface closed, and a pair of brackets 124c, 124c projectingly provided on laterally opposite sides of the base portion 124a.

The pair of brackets 32d, 32d of the valve member 32 are superposed on inner sides of the pair of brackets 19a, 19a of the retainer 19, and further, the pair of brackets 124c, 124c of the actuator housing 124 are superposed on inner sides of the pair of brackets 32d, 32d of the valve member 32. A pivot pin 125 is mounted to extend through a total of the six brackets 19a, 19a; 32d, 32d and 124c, 124c and fixed by a clip 126. An end of the actuator housing 124 is fastened at its end to the retainer 19 by a bolt 127 and hence, the actuator housing 124 is fixed to the retainer 19 by the bolt 127 and the pivot pin 125.

An actuator 128 comprising laminated piezoelectric elements 33 (or an actuator 128 formed by laminating a plurality of piezoelectric elements 33 on one another) is accommodated within the cylindrical portion 124b of the actuator housing 124. Upper surfaces of the laminated piezoelectric elements 33 are fixed to a ceiling surface of the cylindrical portion 124b, and lower surfaces of the laminated piezoelectric elements 33 are fixed to an upper surface of the narrow portion 32c of the valve member 32. In this manner, the actuator 128 is formed of the small-sized and lightweight laminated piezoelectric elements 33 and hence, it is possible to ensure a sufficient operating stroke of the actuator 128, while reducing the size and weight of the actuator.

Figure 18:
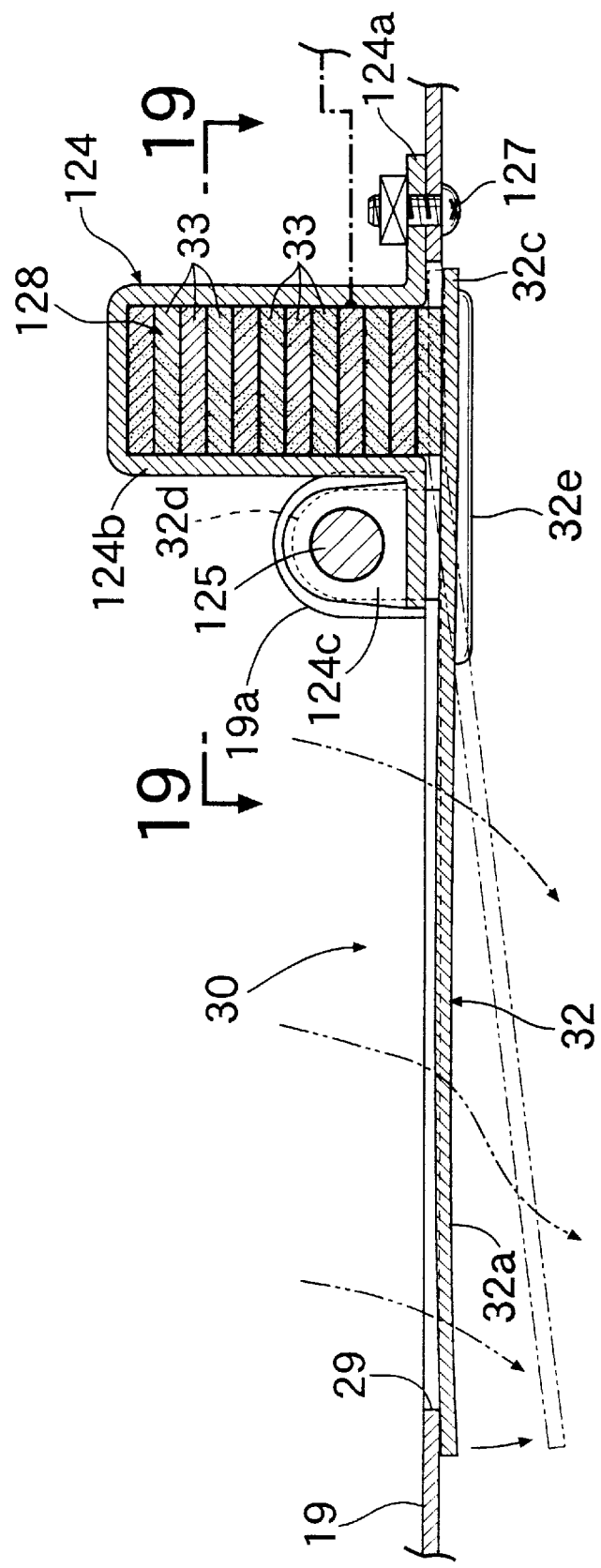
Figure 19:
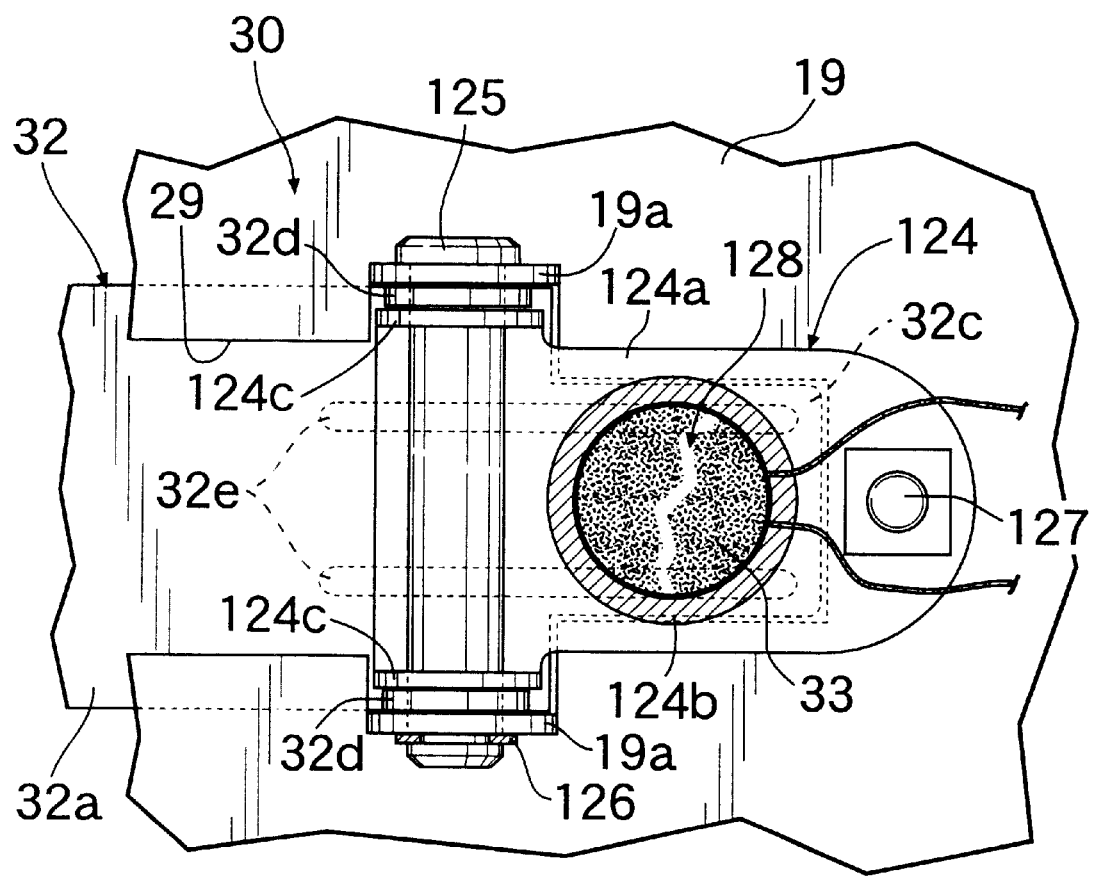
Figure 20:
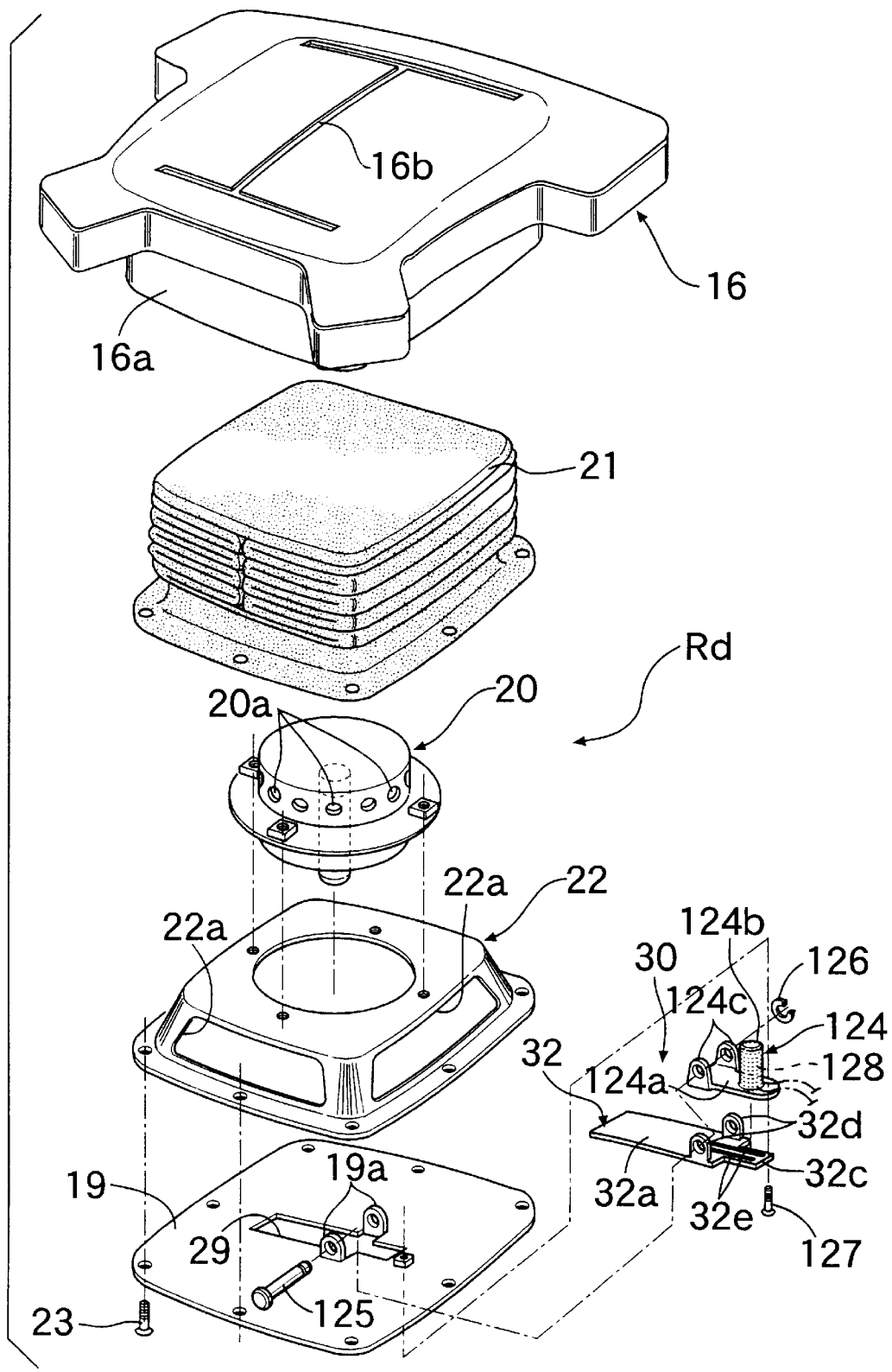
Figure 21:
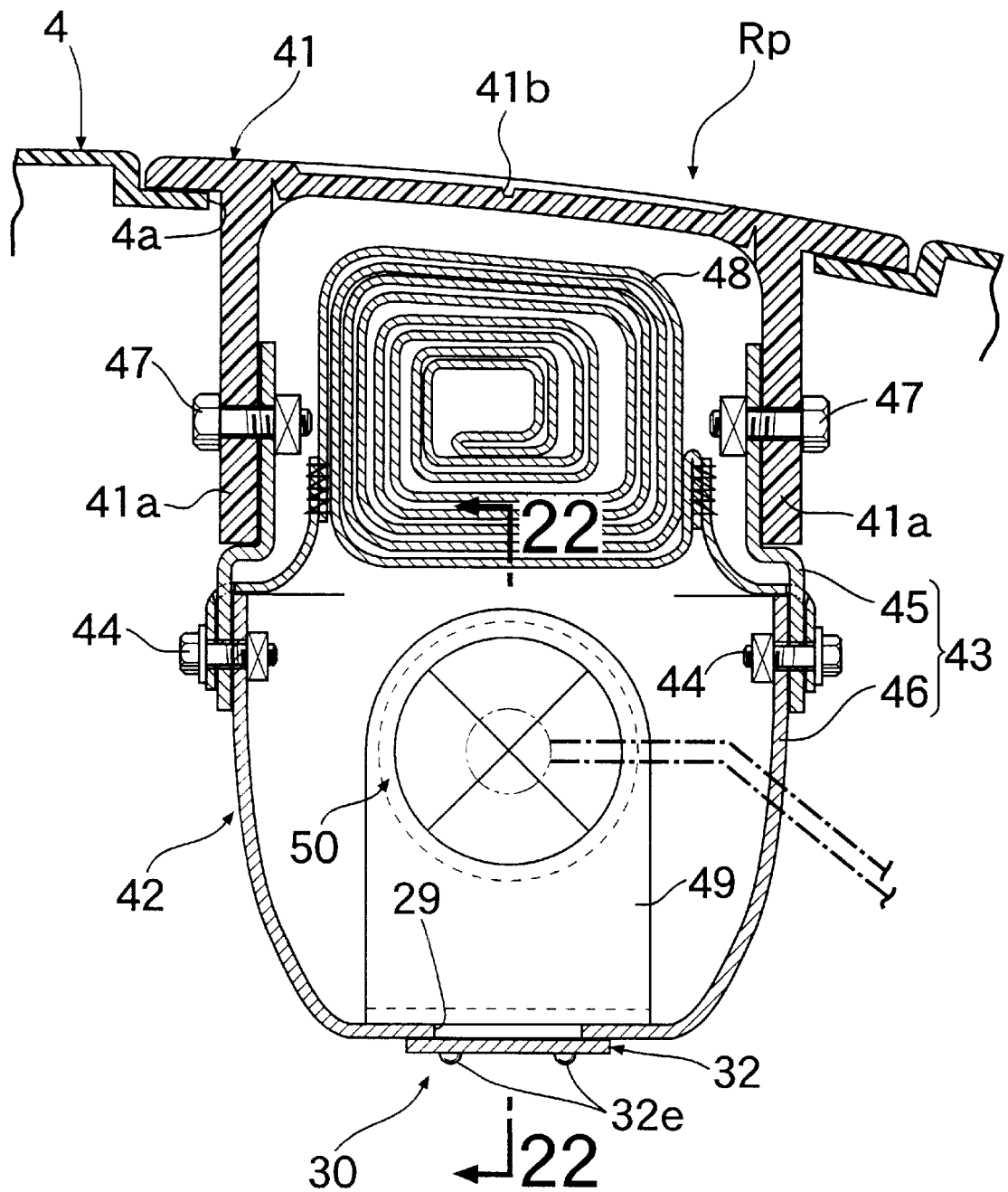
Figure 22:
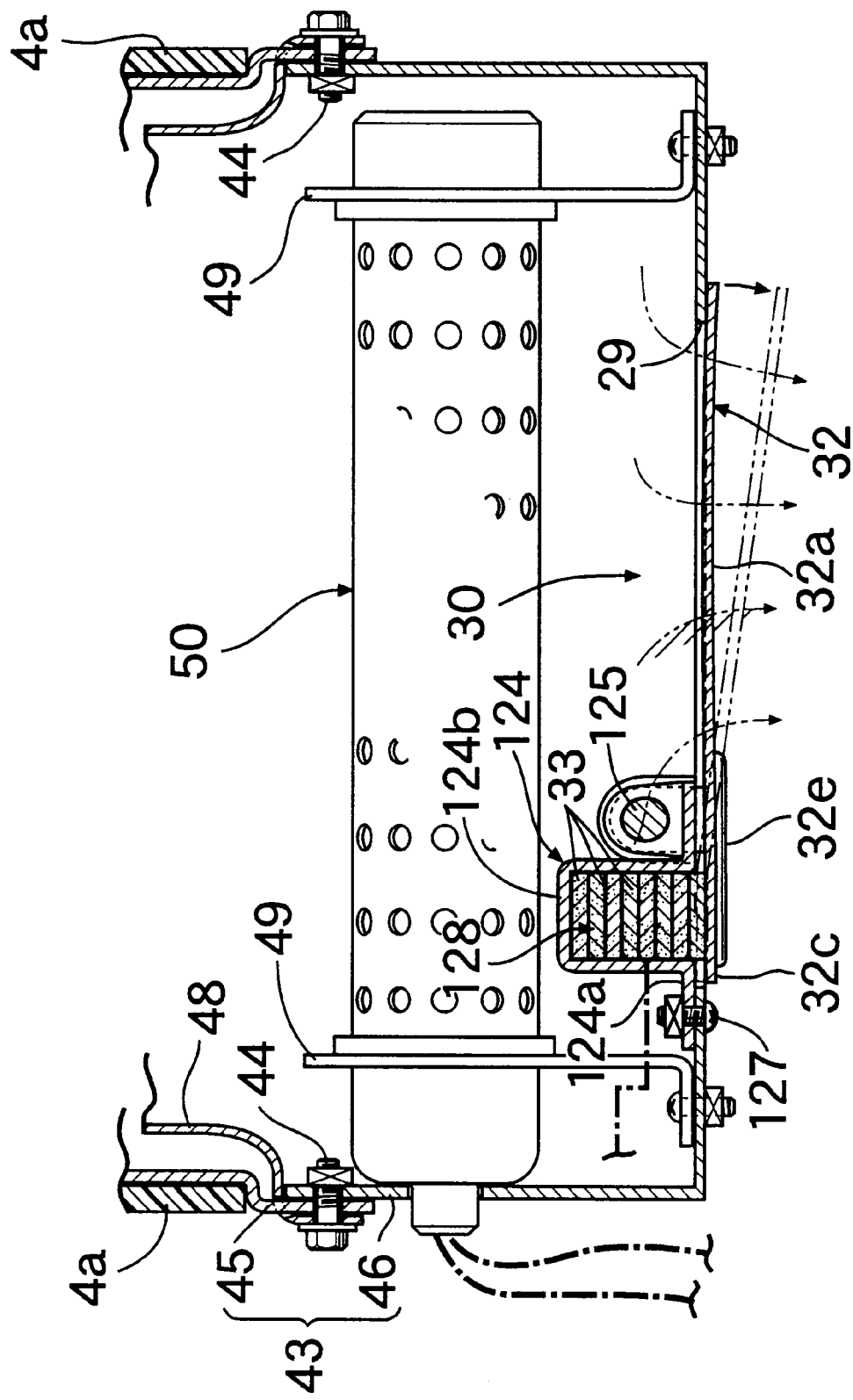
Figure 23:
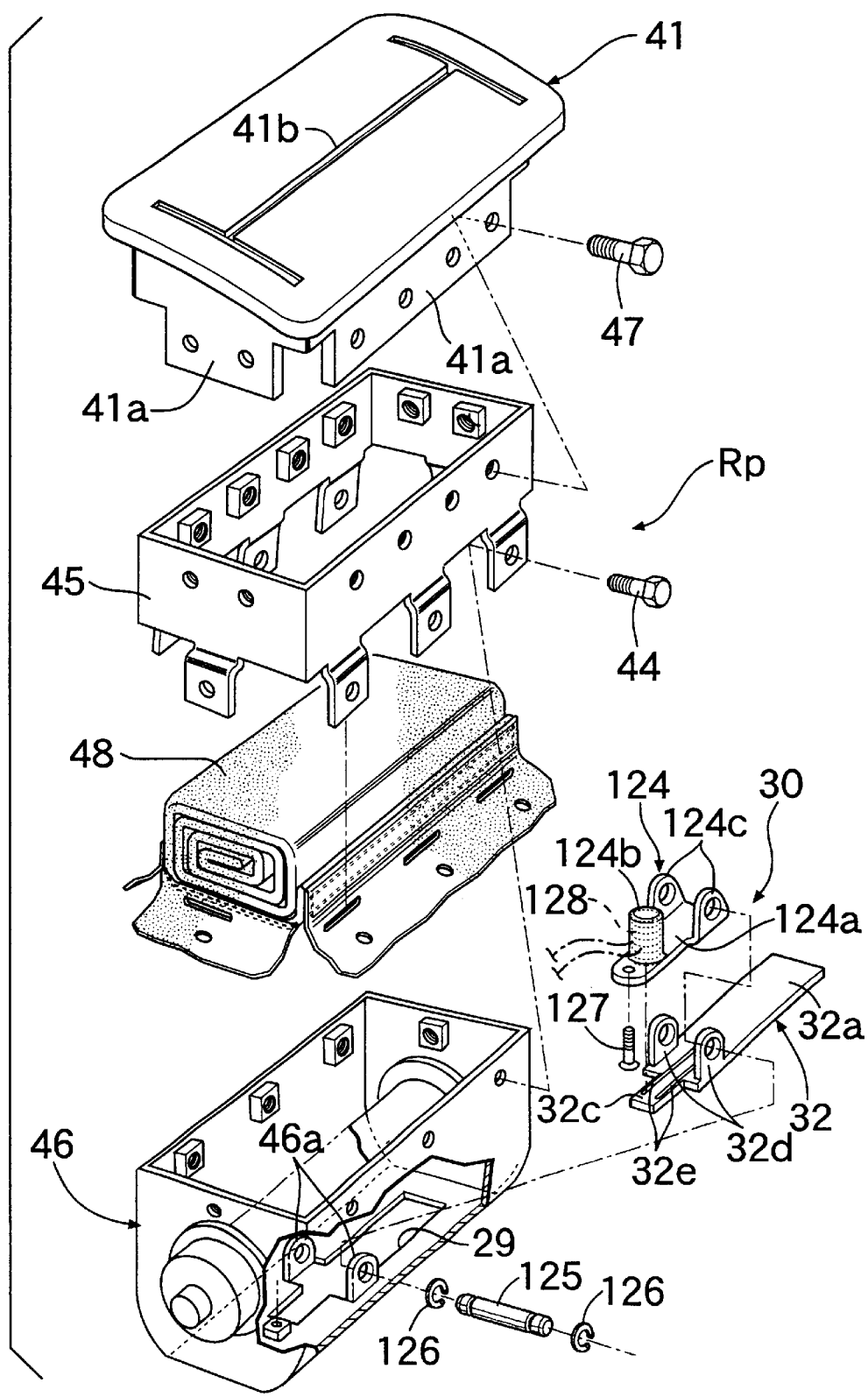

When no current is supplied to the laminated piezoelectric elements 33 of the actuator 128, the lower surface of the actuator 128 applies a downward load to the narrow portion 32c of the valve member 32 and hence, the body portion 32a of the valve member 32 pivotally supported by the pivot pin 125 is resiliently urged upwards against the peripheral edge of the vent hole 29 of the retainer 19. Namely, when the actuator 128 is not in operation, a preset load is applied to the body portion 32a of the valve member 32 made of a resilient material in a valve closing direction. Therefore, it is possible to prevent the valve member 32 from being opened immediately when the inflator 20 generates a high-pressure gas, thereby avoiding the leakage of the high-pressure gas. Shown by the solid lines in FIG. 18 is a state in which the body portion 32a of the valve member 32 has been slightly curved upwards relative to the vent hole 29 and a preset load has been applied in the valve closing direction.

When an acceleration equal to or larger than a predetermined value is detected upon collision of a vehicle, an air bag deployment control unit (not shown) ignites the inflator 20, and the air bag 21 expanded by a gas generated by the inflator 20 breaks the thin tear-off line 16b formed into the H-shape on the rear cover 16 to deploy into a vehicle compartment. During this time, the amount of current supplied to the actuator 128 of the control valve 30 is controlled in accordance with the attitude and the physique of an occupant or a vehicle speed or the like to change the opening degree of the vent hole 29.

More specifically, when the pressure of the gas generated by the inflator 20 is raised, the valve member 32 supported on the outer surface of the retainer 19 is flexed by the pressure of the gas to open the vent hole 29, thereby permitting the surplus gas to be discharged outside. At this time, the actuator 128 comprising the laminated piezoelectric elements 33 is expanded in a lengthwise direction to urge the narrow portion 32c of the valve member 32 downwards by controlling the amount of current supplied to the actuator 128. Therefore, a load is generated to bias the valve member 32 in the closing direction against the pressure of the gas within the retainer 19, thereby permitting the opening degree of the vent hole 29 to be controlled to any level.

Figure 24:
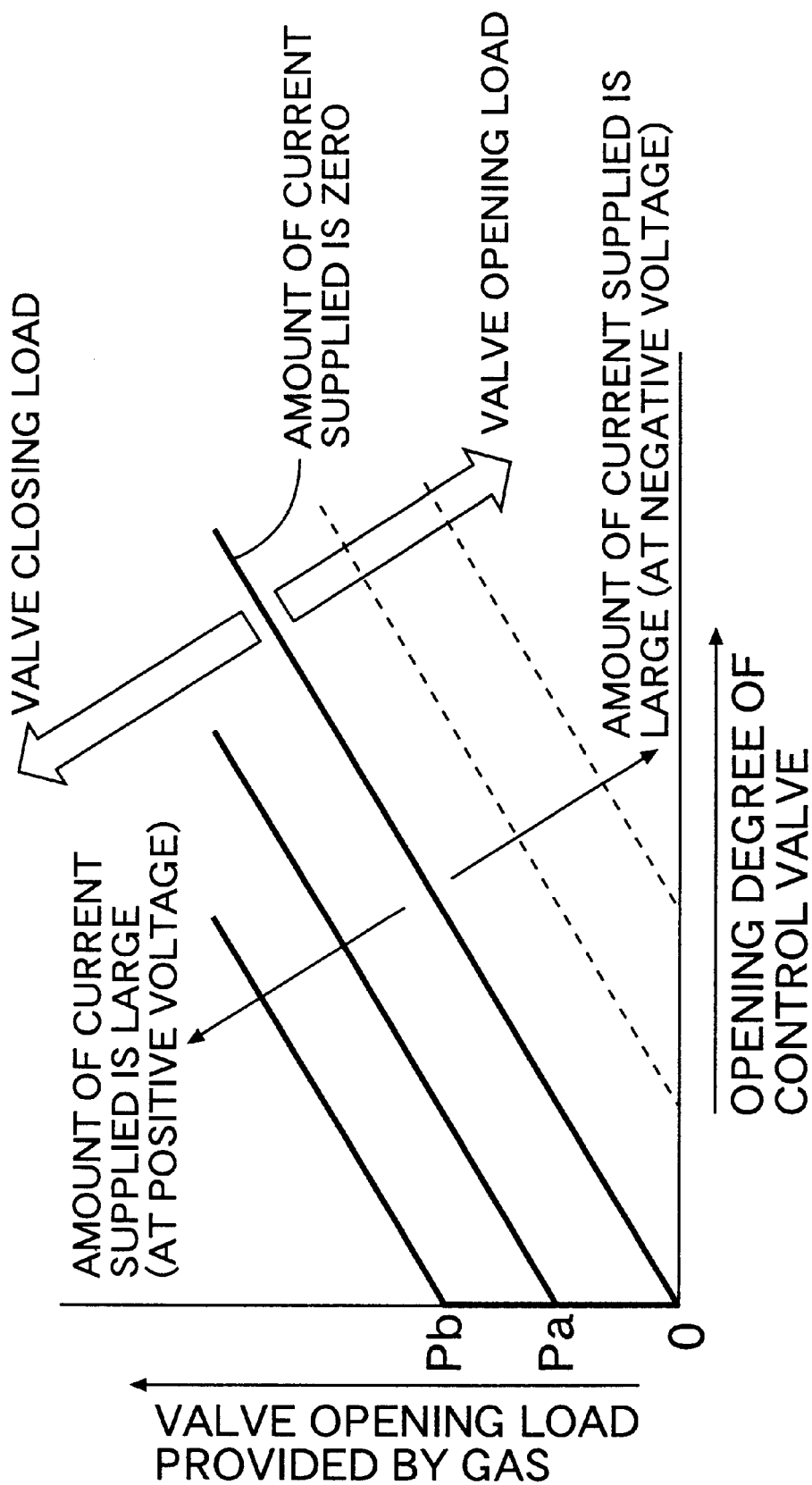
Figure 25:
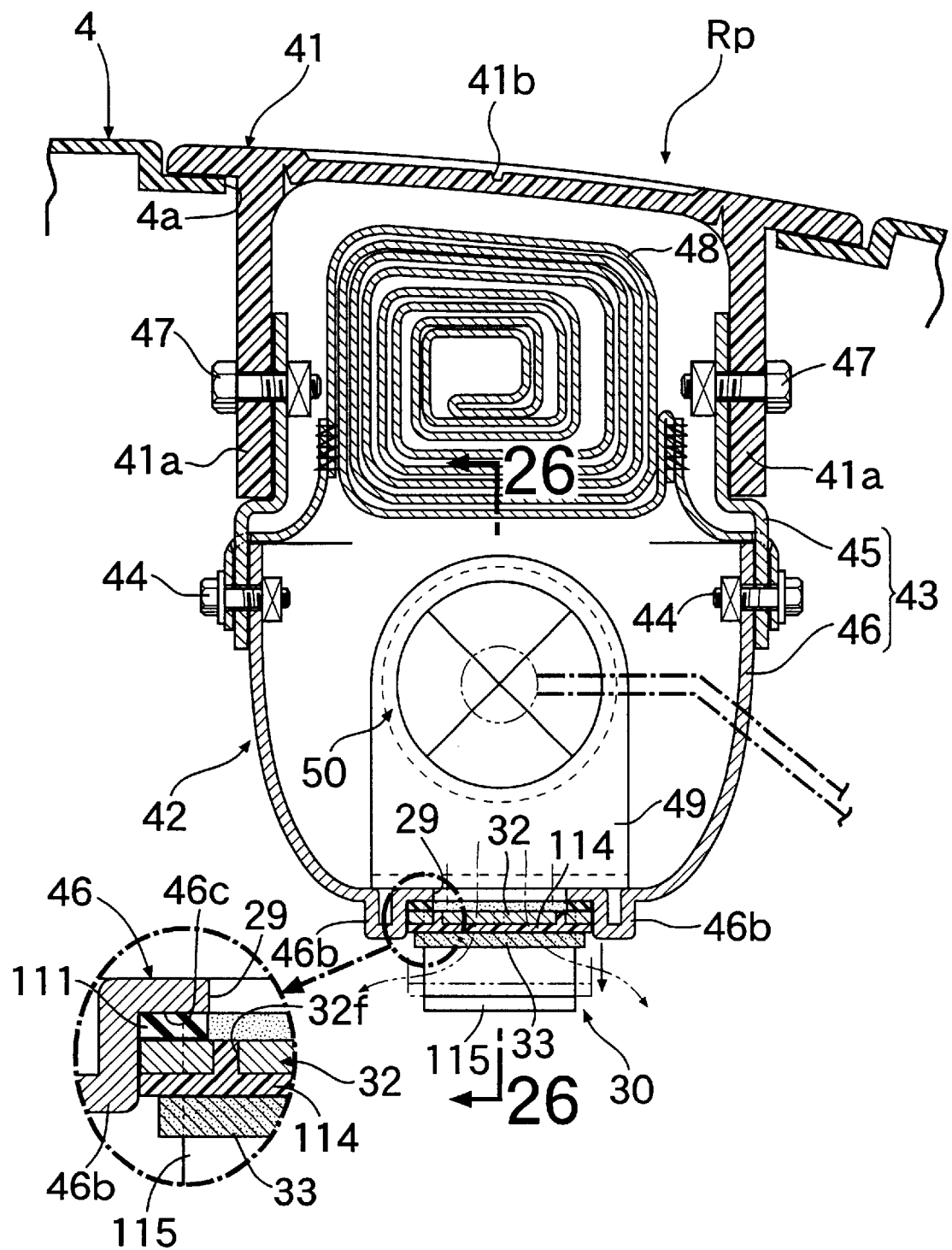

When the amount of current supplied to the actuator 128 is zero as shown in FIG. 24, the control valve 30 is opened, as soon as a load intended to open the valve member 32 is generated by the pressure of the gas, and the amount by which the control valve 30 is opened is increased linearly in accordance with an increase in pressure of the gas. However, when the amount of current supplied to the actuator 128 (at a positive voltage) is increased from zero, the control valve 30 is not opened immediately even if the pressure of the gas is generated, and after the pressure of the gas has reached Pa or Pb in accordance with the increase in amount of current supplied, the amount of control valve 30 opened is increased linearly from zero in accordance with a further increase in pressure of the gas. The preset load applied to the valve member 32 is not taken into consideration in FIG. 24, but when the preset load is applied, the same effect, as when the amount of current supplied to the actuator 128 is increased without consumption of an electric power, is exhibited.

If supplying of current at a negative voltage opposite to that described above to the actuator 128 is carried out, as shown by a broken line in FIG. 24, the laminated piezoelectric elements 33 can be contracted in the lengthwise direction to apply a load to the valve member 32 in a valve opening direction. If this technique is employed, the load generated by the laminated piezoelectric elements 33, in addition to the pressure of the gas, drives the valve member 32 in the opening direction and hence, the control valve 30 can be opened quickly.

In this way, even when the valve member 32 of the control valve 30 is opened by the pressure of the gas generated by the inflator 20, the opening degree of the control valve 30 can be controlled to any level by changing the amount and direction of current to the actuator 128.

The structure of an air bag device Rp for an assistant driver's seat will be described below with reference to FIGS. 21 to 24. The duplicated description of the same portions or components as in the structure in the first embodiment is omitted and mainly, different points will be described.

A control valve for opening and closing a rectangular vent hole 29 defined in a bottom of a lower retainer 46 has the same structure as in the air bag device for the driver's seat, so that a valve member 32 is swung about a pivot pin 125 by supplying of current to laminated piezoelectric elements 33 of an actuator 128 accommodated in an actuator housing 124, thereby controlling the opening degree of the vent hole 29. During this time, a preset load is applied to a body portion 32a of the valve member 32 in a valve closing direction, as in the control valve 30 of the air bag device Rd for the driver's seat. Brackets 19a, 19a of a retainer 19 correspond to brackets 46a, 46a (see FIG. 23) of the lower retainer 46.

The operation and effect of the air bag device Rp for the assistant driver's seat are identical to those of the above-described air bag device Rd for the driver's seat.

The structure of a fourth embodiment of an air bag device Rp for an assistant driver's seat will be described with reference to FIGS. 25 to 28, wherein the duplicated description of the same portions or components as in the structure in the first embodiment is omitted and mainly, different points will be described.

A control valve 30 mounted on a lower retainer 46 includes a rectangular vent hole 29 defined in a bottom of the control valve 30. A "U"-shaped projection 46b is provided to protrude outwards (toward the outside of the lower retainer 46) so as to surround three sides of an outer periphery of the vent hole 29. A flat valve seat 46c is formed on an inner periphery of the projection 46b, and a seal member 111 made of an elastomer such as a rubber or the like is mounted on the valve seat 46c. The control valve 30 includes a rectangular valve member 32 capable of being seated on the valve seat 46c (namely, on the seal member 111). A shorter one of sides of the valve member 32 is fixed to the lower retainer 46 by three valve member fixing bolts 112. In this case, a spacer 113 (see FIG. 28) made of a metal is interposed between the valve member 32 and the lower retainer 46 in order to absorb the thickness of the seal member 111.

The provision of the projection 46b to surround the vent hole 29 ensures that when the valve member 32 is to be fixed to the lower retainer 46 by the valve member fixing bolts 112, the valve member 32 can be positioned by using the projection 46b as a guide and fixed at a location in which it can be seated correctly on the valve seat 46c. Alternatively, the valve member 32 can be fixed by a spot welding or by means of a rivet, in place of the valve member fixing bolts 112.

A plate-shaped piezoelectric element 33 as an actuator is fixed to a lower surface of the valve member 32 at a location closer to the valve member fixing bolts 112 through an adhesive 114. The area of the piezoelectric element 33 is set at such a value as slightly larger than half the area of the valve member 32 and thus, the amount of expensive piezoelectric element 33 used is reduced. A plurality of openings 32f are defined in the valve member 32, and a portion of the adhesive is penetrated into the openings 32f, thereby increasing the strength of adhesion of the valve member 32 and the piezoelectric element 33 and preventing the peeling-off of the piezoelectric element 33.

A stopper 115 of a substantially L-shape in section is fixed to the lower retainer 46 at a location on the opposite side of the vent hole 29 to the valve member fixing bolts 112 by two stopper fixing bolts 116, 116. The stopper 115 protrudes outside of the lower retainer 46. Thus, the maximum amount of control valve 30 opened is limited by abutment of a tip end of the valve member 32 curved outwards by the deformation of the piezoelectric element 33 against the stopper 115.

When an acceleration equal to or larger than a predetermined value is detected upon collision of a vehicle, an air bag deployment control unit (not shown) ignites an inflator 50, and an air bag 48 expanded by a gas generated by the inflator 50 breaks a thin tear-off line 41b (see FIG. 28) formed into an H-shape on a lid 41 to deploy into a vehicle compartment. During this time, the amount of current supplied to the piezoelectric elements 33 of the control valve 30 is controlled in accordance with the attitude and the physique of an occupant or a vehicle speed or the like to change the amount by which the valve member 32 is curved (namely, the opening degree of the vent hole 29).

Figure 26:
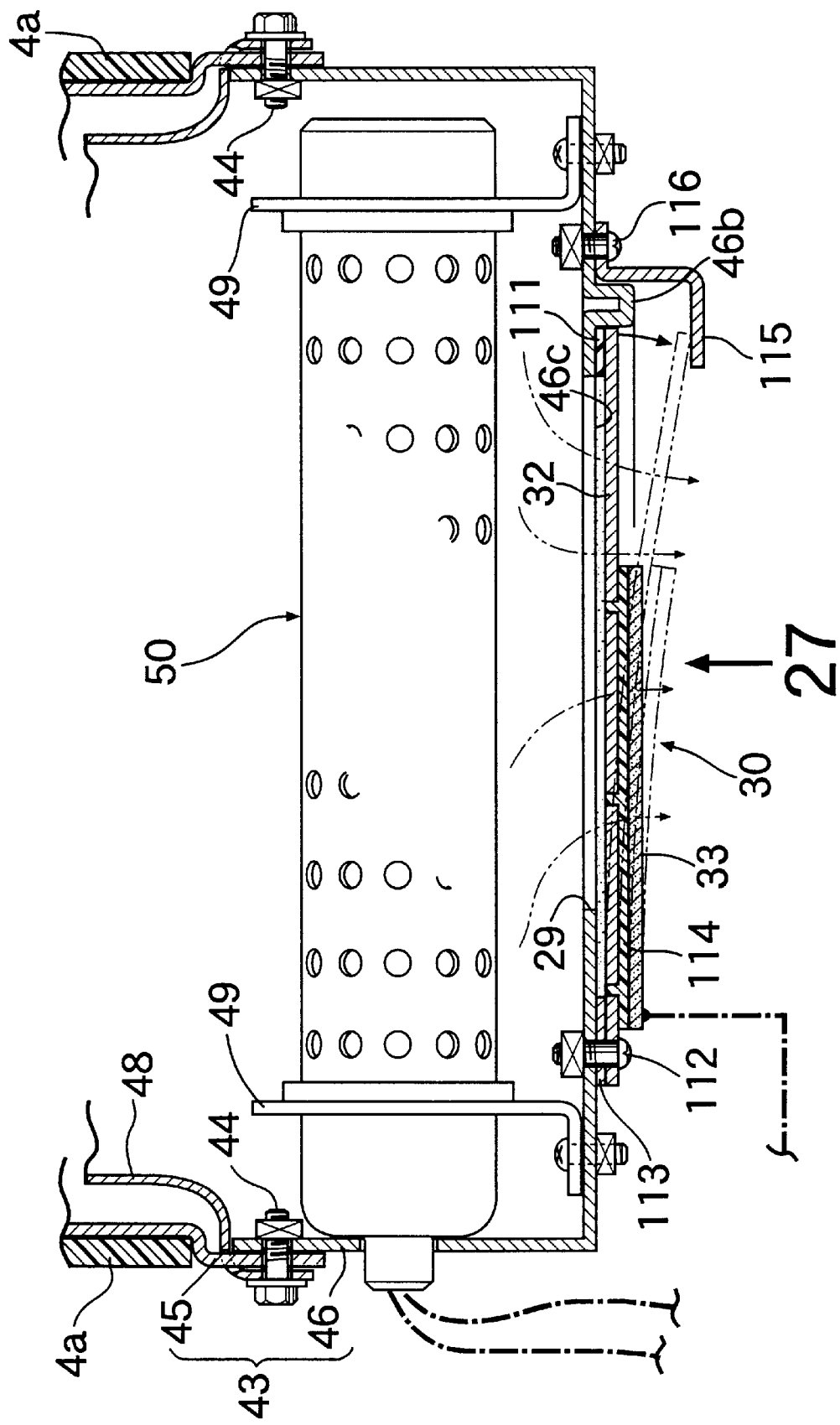
Figure 27:
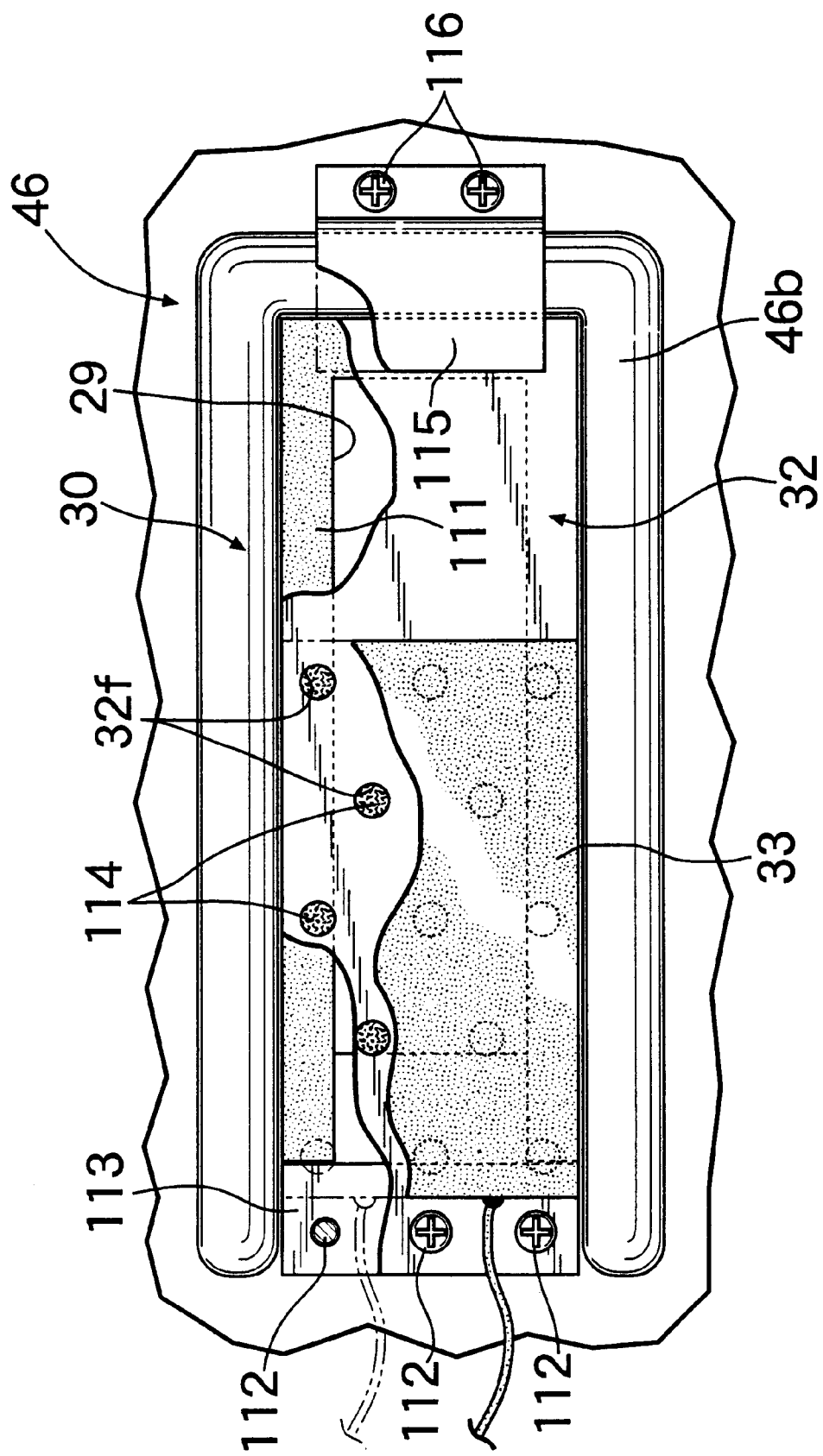
Figure 28:
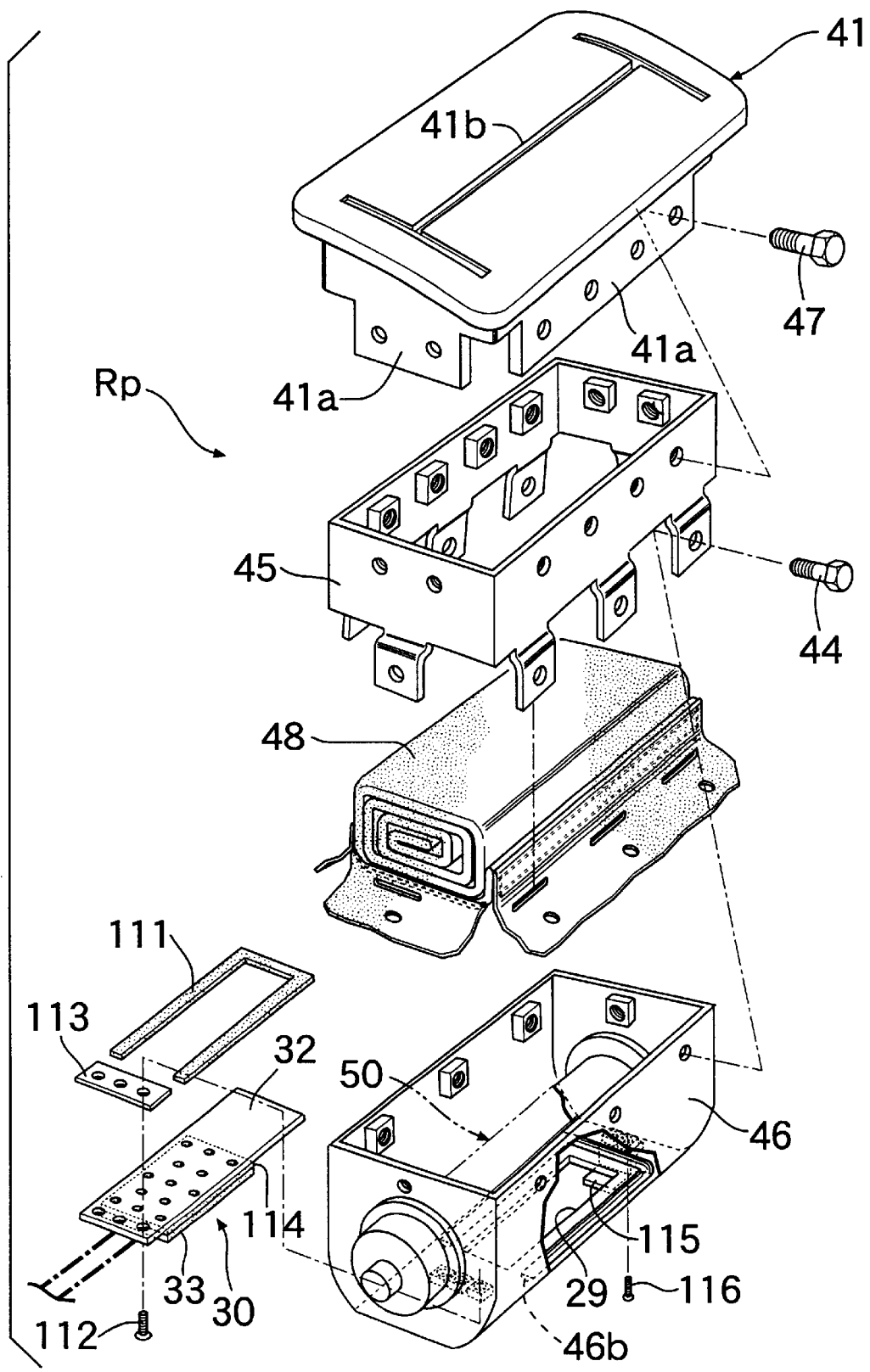

More specifically, when current is not supplied to the piezoelectric element 33, the valve member 32 of the control valve 30 extends rectilinearly to close the vent hole 29, as shown by a solid line in FIG. 26. In this state, the upper surface of the valve member 32 is in resilient abutment against the seal member 111 mounted on the valve seat 46c of the lower retainer 46, thereby preventing the leakage of a high-pressure gas through a gap between the valve seat 46c and the valve member 32.

When current is supplied to the piezoelectric element 33 from this state, the piezoelectric element 33 is deformed in accordance with an amount of current supplied, as shown by a dashed line in FIG. 26 and hence, the valve member 32 is curved about its fixed end to open the vent hole 29. At this time, the free end of the valve member 32 is brought into abutment against the stopper 115, leading to the maximum curved amount and hence, it is possible to prevent the valve member 32 from being flexed outwards to a large extent by the pressure of the gas flowing from the vent hole 29 which would provide an excessive opening degree, or to prevent the brittle piezoelectric element 33 from being excessively deformed and damaged.

In the above manner, the opening degree of the vent hole 29 can be controlled accurately and continuously by an extremely simple structure in which the valve member 32 covering the vent hole 29 is only curved by supplying the current to the piezoelectric element 33 mounted on the valve member 32. Moreover, the piezoelectric element 33 is mounted on only a portion of the valve member 32 and hence, as compared with a case where the piezoelectric element 33 is mounted on the entire surface of the body portion 32a of the valve member 32, the amount of expensive piezoelectric elements 33 used can be decreased to contribute to a reduction in cost.

Figure 29:
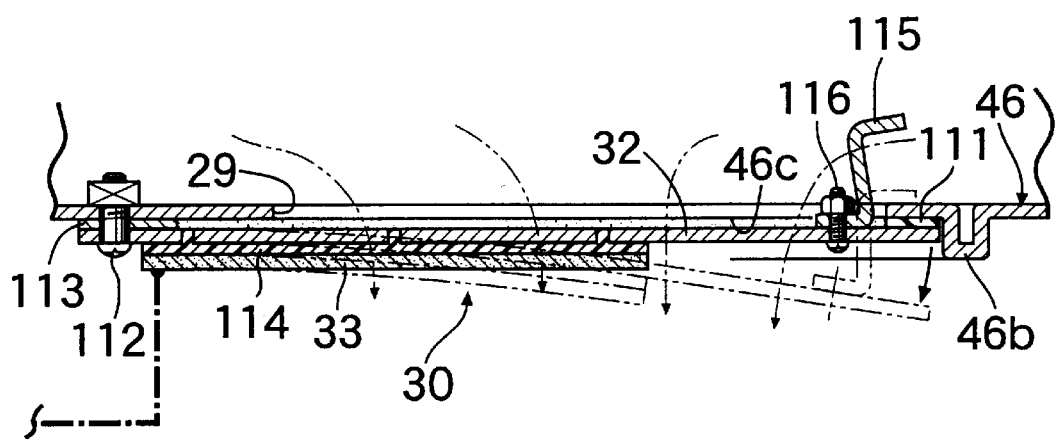
FIG. 29 is a view showing a modification of a stopper.

FIG. 29 shows a modification to the stopper 115 in the fourth embodiment.

Although the stopper 115 in the fourth embodiment has been fixed to the lower surface of the lower retainer 46 by the stopper fixing bolts 116, 116 (see FIG. 26), the stopper 115 of this modification is fixed to an upper surface of the valve member 32 of the control valve 30 at a location closer to the free end of the valve member 32 by the stopper fixing bolts 116, 116. Therefore, when the control valve 30 is opened to a large extent, the stopper 115 is brought into abutment against the upper surface of an edge of an opening of the vent hole 29 in the lower retainer 46 to limit the maximum opening degree of the valve member 32.

Figure 30:
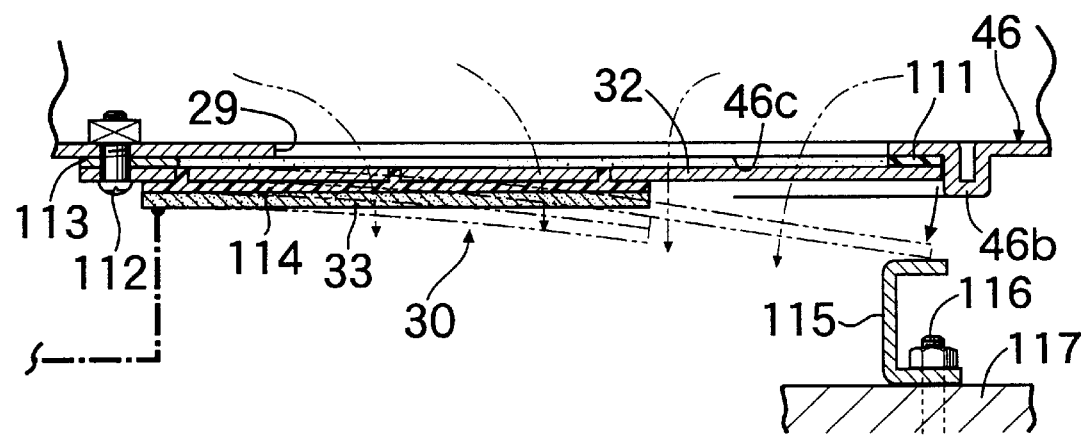
FIG. 30 is a view showing another modification of the stopper.

FIG. 30 shows another modification to the stopper 115 in the fourth embodiment.

The stopper 115 of this modification is fixed to another member 117 different from the lower retainer 46 by stopper fixing bolts 116, 116. Therefore, when the valve member 32 of the control valve 30 is opened to a large extent, the stopper 115 is brought into abutment against the lower surface of the free end of the valve member 32 to limit the maximum opening degree of the valve member 32.

Figure 31:
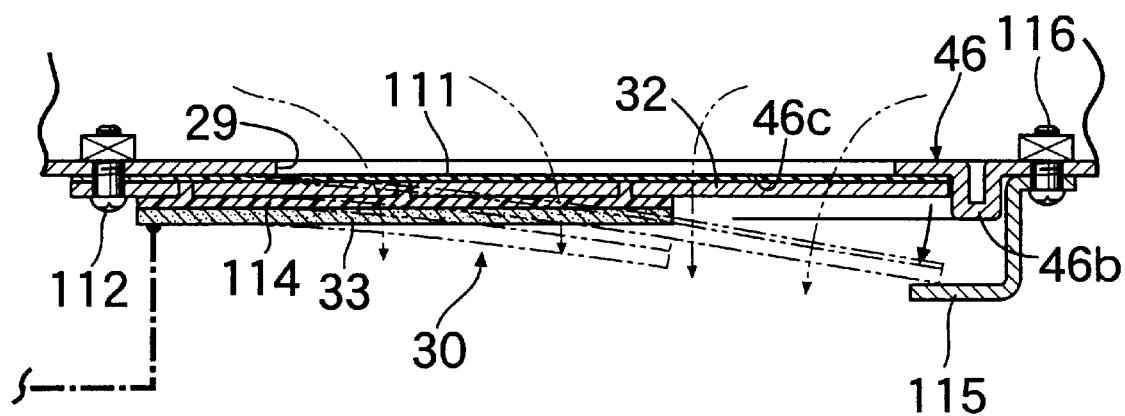
FIG. 31 is a view showing a modification of a seal member.

FIG. 31 shows a modification to the seal member 111 in the fourth embodiment.

Although the seal member 111 in the fourth embodiment has been fixed to the lower surface of the valve seat 46c of the lower retainer 46, the seal member 111 of this modification is fastened to the entire upper surface of the valve member 32. The seal member 111 may be fastened to only a portion of member 32 abutting against the valve seat 46c of the lower retainer 46.

Figure 32:
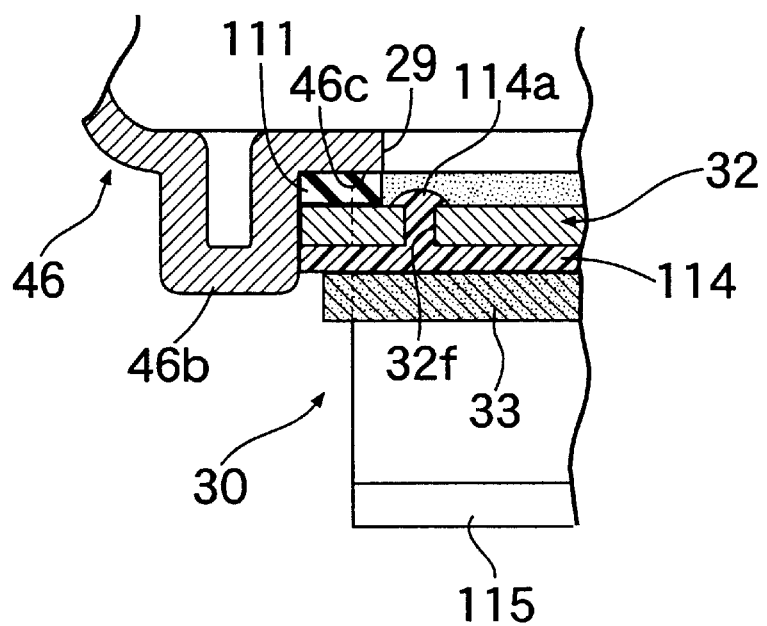
FIG. 32 is a view showing a modification of a technique for fixing a piezoelectric element by an adhesive.

FIG. 32 shows a modification to the technique for fixing the piezoelectric element 33 by the adhesive 114 in the fourth embodiment.

In the fourth embodiment, the adhesive 114 has been penetrated into the openings 32f defined in the valve member 32 to increase the adhesive strength, but in this modification, a portion of the adhesive 114 is permitted to overflow the openings 32f in the valve member 32 to form a slip-off preventing portion 114a, so that the valve member 32 and the piezoelectric element 33 are adhered further firmly to each other.

Figure 33:
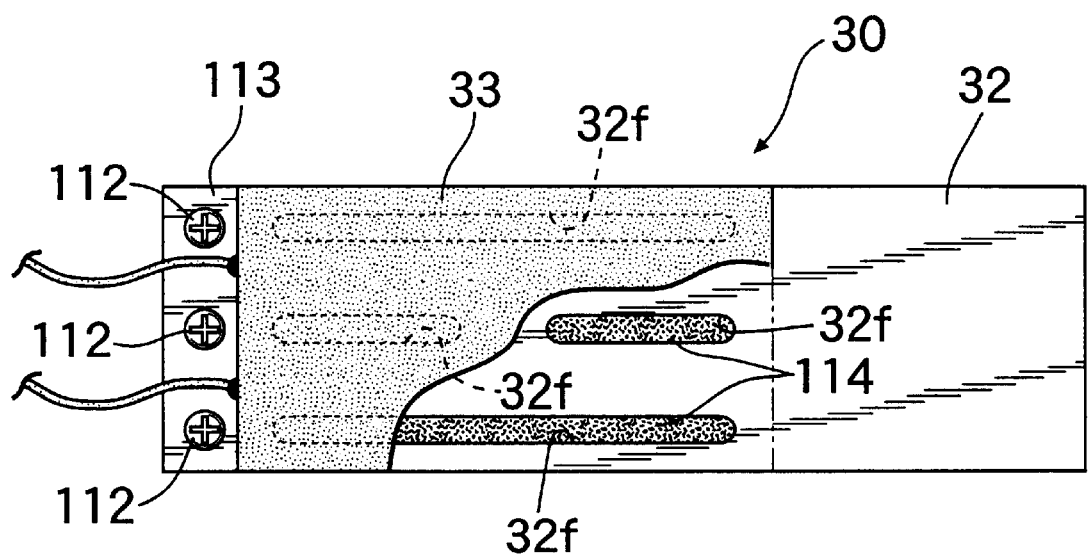
FIG. 33 is a view showing another modification of a technique for fixing a piezoelectric element by an adhesive.
Figure 34:
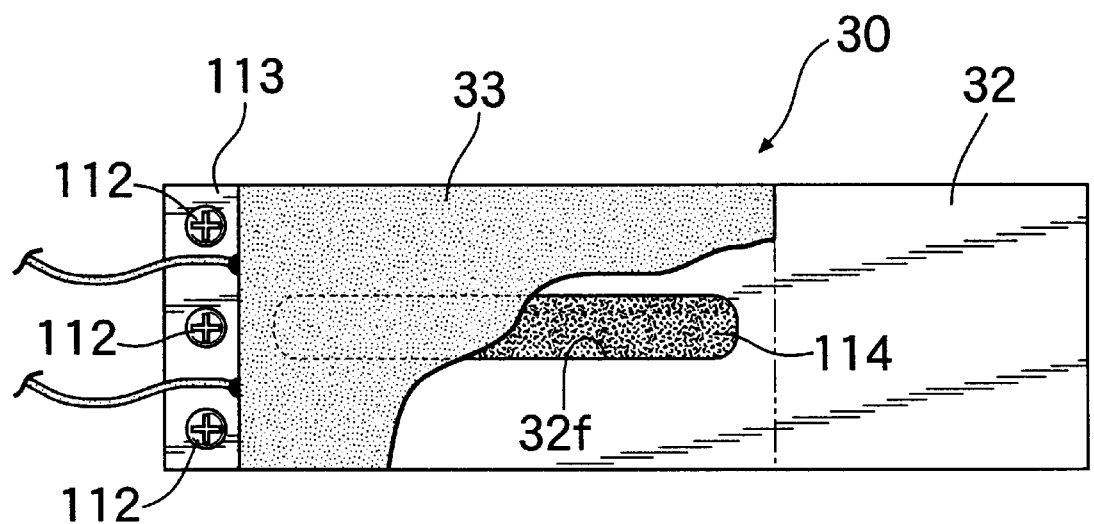
FIG. 34 is a view showing a further modification of a technique for fixing a piezoelectric element by an adhesive.

FIGS. 33 and 34 show two other modifications to the technique for fixing the piezoelectric element 33 by the adhesive in the fourth embodiment.

In FIG. 33, four openings 32f, into which the adhesive 114 is penetrated, are made in the forms of shorter and longer grooves, respectively. In FIG. 34, a single opening 32f, into which the adhesive 114 is penetrated, is made in the form of a wide groove. Even with these modifications, the amount of adhesive penetrated into the opening 32f or the openings 32f can be increased to increase the adhesive strength.

Figure 35:
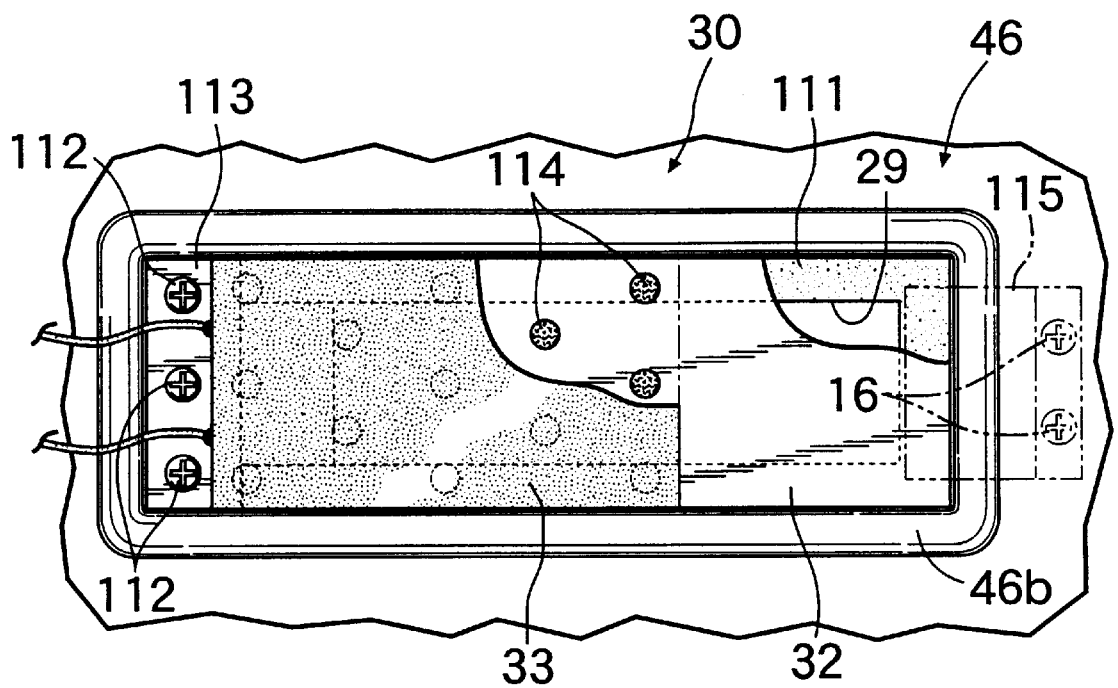
FIG. 35 is a view showing a modification of a projection on a lower retainer.
Figure 36:
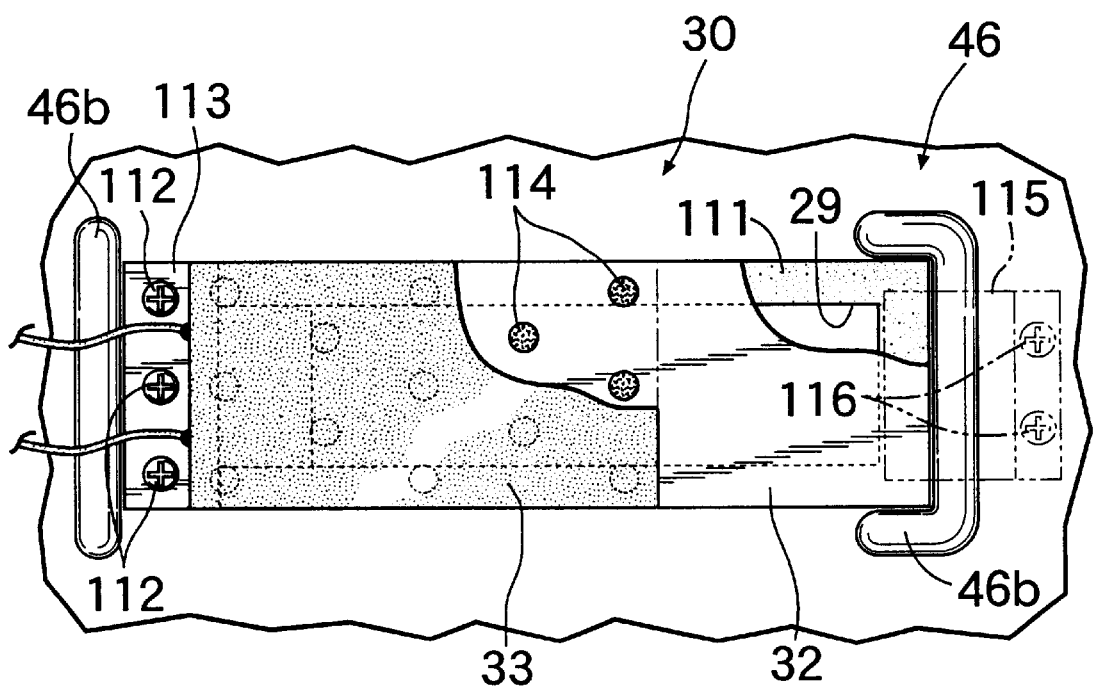
FIG. 36 is a view showing another modification of a projection on the lower retainer.
Figure 37:
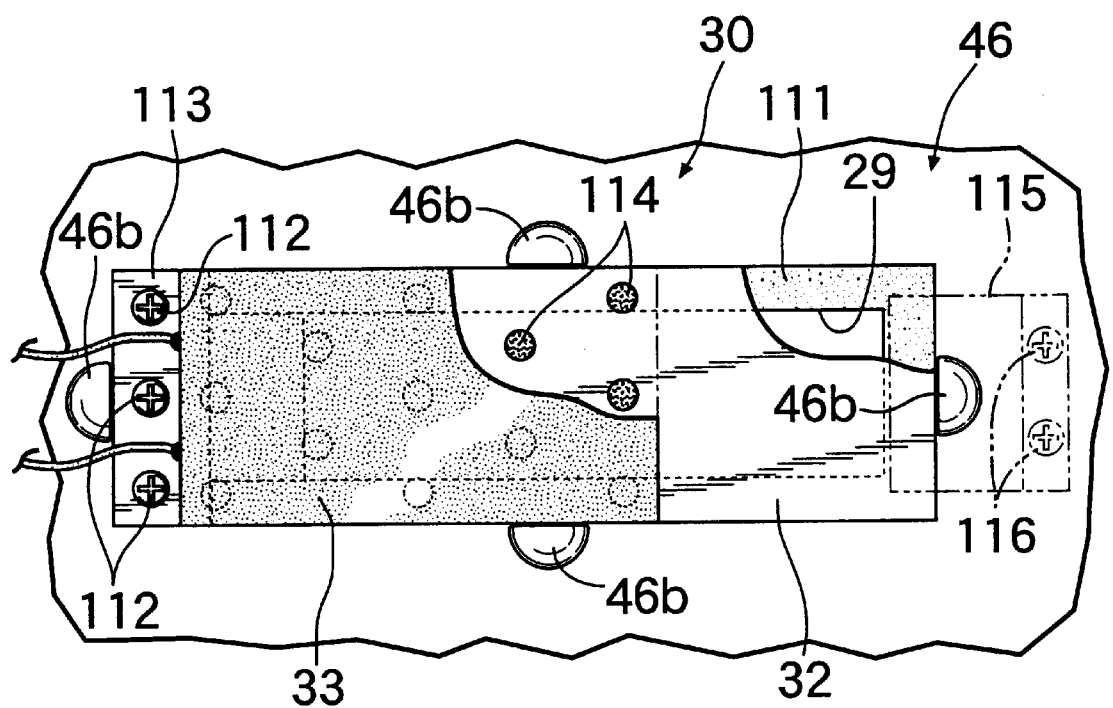
FIG. 37 is a view showing a further modification of a projection on the lower retainer.

FIGS. 35 to 37 show three other modifications to the projections 46b on the lower retainer 46.

In FIG. 35, a single rectangular projection 46b completely encloses the outer periphery of the vent hole 29 to position the valve member 32. In FIG. 36, a straight projection 46b and a U-shaped projection 46b are provided. The former projection 46b positions the fixed end of the valve member 32, and the latter projection 46b positions the free end of the valve member 32. In FIG. 37, four projections 46b protrude in a semicircular shape to extend along central portions of respective sides of a rectangular vent hole 29, so that they position the valve member 32.

The projection 46b in the fourth embodiment and the projections 46b of the three modifications not only can contribute to the positioning of the valve member 32 for fixing the valve member 32 to the lower retainer 46, but also can prevent a reduction in rigidity of a portion of the lower retainer 46 in the vicinity of the vent hole 29 and can contribute to the seating of the valve member 32 on the valve seat without any gap left therebetween.

Although the embodiments of the present invention have been described in detail, it will be understood that the present invention is not limited to the above-described embodiments, and various modifications in design may be made without departing from the spirit and scope of the invention defined in the appended claims.

For example, each of the retainers 19 and 43 in the first and second embodiments has the single vent hole 29, but may have a plurality of vent holes 29. In this case, a plurality of valve members 32 are provided for each of the vent holes 29.

Although the piezoelectric element has been illustrated as the actuator in each of the embodiments, another type of an actuator such as a solenoid may be employed.

The shape of the vent hole 29, the shape of the valve member 32 of the control valve 30 and the shape of the piezoelectric element 33 (the actuator) are not limited to those described in each of the embodiments, and may be changed properly.

If a suitable reinforcement is provided to the piezoelectric element 33, the valve member 32 can be constructed by the piezoelectric element 33 itself.

What is claimed is:

1. An air bag device including an inflator accommodated in a retainer to which a peripheral edge of an opening of a folded-up air bag is fixed, so that said air bag is deployed by a gas generated by said inflator upon collision of a vehicle to restrain an occupant, wherein a vent hole defined in said retainer can be opened and closed by a control valve operated by an actuator, said control valve including a plurality of divided valve members, and said actuator includes a plurality of actuator elements and said divided valve members are individually operable by said actuator elements associated with the divided valve members, respectively.

2. An air bag device including an inflator accommodated in a retainer to which a peripheral edge of an opening of a folded-up air bag is fixed, so that said air bag is deployed by a gas generated by said inflator upon collision of a vehicle to restrain an occupant, wherein a vent hole defined in said retainer can be opened and closed by a control valve operated by an actuator, said control valve including a plurality of divided valve members, and said actuator includes a plurality of piezoelectric elements and said divided valve members are individually operable by said piezoelectric elements associated with the divided valve members, respectively.

3. An air bag device including an inflator accommodated in a retainer to which a peripheral edge of an opening of a folded-up air bag is fixed, so that said air bag is deployed by a gas generated by said inflator upon collision of a vehicle to restrain an occupant, wherein a vent hole defined in said retainer can be opened and closed by a control valve operated by an actuator, said control valve including a plurality of divided valve members, the plurality of valve members are curved when opened, and the direction of curving of at least one of said valve members being different from that of at least one of the remaining valve members.

4. An air bag device including an inflator accommodated in a retainer to which a peripheral edge of an opening of a folded-up air bag is fixed, so that said air bag is deployed by a gas generated by said inflator upon collision of a vehicle to restrain an occupant, wherein the opening degree of a vent hole defined in said retainer can be controlled by a control valve operated by an actuator, said control valve including a valve member, which is formed of an elastomer material and supported to cover said vent hole from the outside, so that when said vent hole is opened by a gas generated by said inflator, said actuator generates a load in a direction to close or open the vent hole by said valve member of said control valve;

said valve member being of an elongated shape and carried pivotally at an intermediate portion thereof on said retainer, said valve member having a first portion on one side of said intermediate portion and a second portion on the other side of the intermediate portion, the first portion opens and closes the vent hole while the second portion receives the load from the actuator in a direction urging the valve to pivot to close the vent hole.

5. An air bag device including an inflator accommodated in a retainer to which a peripheral edge of an opening of a folded-up air bag is fixed, so that said air bag is deployed by a gas generated by said inflator upon collision of a vehicle to restrain an occupant, wherein a vent hole defined in said retainer can be opened and closed by a control valve having a valve member operated by an actuator, and said air bag device includes a stopper for limiting the maximum opening degree of said valve member of said control valve to an amount less than that achievable using the actuator in an unrestrained condition.

6. An air bag device according to claim 5, further including a seal member mounted on at least one of a valve seat formed at a peripheral edge of the vent hole and the valve member seated on the valve seat.

7. An air bag device according to claim 5, further including a projection provided around the periphery of said vent hole which abuts against the outer periphery of said valve member to position said valve member relative to said vent hole.

8. An air bag device according to claim 5, wherein said actuator comprises a piezoelectric element adhered to said valve member, and said valve member is provided with an opening into which an adhesive is penetrated in order to increase the strength of adhesion between said valve member and said actuator.

9. An air bag device according to claim 1, wherein portions of said vent hole are respectively associated with said divided valve members.

10. An air bag device according to claim 5, wherein said actuator moves said valve member by flexing a portion of the valve member out of engagement with said retainer.

11. An air bag device according to claim 5, wherein said actuator is piezoelectric.

12. An air bag device according to claim 4, wherein said actuator is piezoelectric.

13. An air bag device according to claim 4, wherein said valve member comprises a plurality of divided valve members which are curved when opened, and the direction of curving of at least one of said valve members being different from that of at least one of the remaining valve members.

14. An air bag device according to claim 4, wherein said actuator moves said valve member by flexing a portion of the valve member out of engagement with said retainer.

15. An air bag device according to claim 4, further including a stopper for limiting the maximum opening degree of said valve member of said control valve such that the valve member restricts flow of the gas through the vent hole when opened to the maximum opening degree.

16. An air bag device according to claim 4, wherein said actuator includes a plurality of piezoelectric elements laminated together.

17. An air bag device according to claim 5, including a projection provided around the periphery of said vent hole which abuts against an outer peripheral surface of said valve member to position said valve member relative to said vent hole.

* * * * *

UNITED STATES PATENT AND TRADEMARK OFFICE
CERTIFICATE OF CORRECTION

PATENT NO. : 6,547,274 B2
DATED : April 15, 2003
INVENTOR(S) : Fumiharu Ochiai

It is certified that error appears in the above-identified patent and that said Letters Patent is hereby corrected as shown below:

Column 1,
Line 39, change "Model registration Publication No. 5-6206 suffers from a" to
-- Model Registration Publication No. 5-6206 suffers from a --.

Column 7,
Line 2, change "20, and the air bag 21 brakes a thin tear-off line 16*b* (see FIG." to
-- 20, and the air bag 21 breaks a thin tear-off line 16*b* (see FIG. --.

Column 8,
Line 11, change "A rectangular vent hole 29 defined in the bottom the lower" to
-- A rectangular vent hole 29 defined in the bottom of the lower --.

Signed and Sealed this

Twenty-first Day of October, 2003

JAMES E. ROGAN
*Director of the United States Patent and Trademark Office*